US006327592B1

(12) United States Patent
Yoshikawa

(10) Patent No.: US 6,327,592 B1
(45) Date of Patent: *Dec. 4, 2001

(54) DATA CALCULATOR PERFORMING AUTOMATIC RECALCULATION BASED ON DATA STRUCTURE NETWORK

(75) Inventor: Masazumi Yoshikawa, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,091

(22) Filed: Jul. 2, 1998

(30) Foreign Application Priority Data

Jul. 4, 1997 (JP) .................................................. 9-194821

(51) Int. Cl.⁷ .................................................. G06F 17/00

(52) U.S. Cl. ............................................ 707/101; 707/503

(58) Field of Search ...................... 707/101, 102, 707/503, 504, 505, 506, 507, 509, 103, 104

(56) References Cited

U.S. PATENT DOCUMENTS

| 5,421,008 | | 5/1995 | Banning et al. ...................... 395/600 |
| 5,603,021 | * | 2/1997 | Spencer et al. ........................... 707/4 |
| 5,630,126 | * | 5/1997 | Redpath .............................. 707/103 |
| 5,632,009 | * | 5/1997 | Rao et al. ............................. 707/509 |
| 5,880,742 | * | 3/1999 | Rao et al ............................. 345/440 |
| 6,002,865 | * | 12/1999 | Thomsen .............................. 395/600 |

FOREIGN PATENT DOCUMENTS

| 4-222053 | 8/1992 | (JP) . |
| 4-332080 | 11/1992 | (JP) . |
| 5-224906 | 9/1993 | (JP) . |
| 5-224907 | 9/1993 | (JP) . |
| 6-250834 | 9/1994 | (JP) . |
| 9-006765 | 1/1997 | (JP) . |

OTHER PUBLICATIONS

Aonuma "An interactive simulation modeling system: DYNAGRAPH for multi–period planning on an APL spreadsheet", ACM 1988, pp. 10–18.*

Sarukkai et al "Parallel program visualization using SIEVE.1", ACM 1992, pp. 157–166.*

Wilde "A WYSIWYC (what you see is what you compute) spreadsheet", IEEE 1993, pp. 72–76.*

Hassinen et al "Structured spreadsheet calculation", IEEE 1988, pp. 129–133.*

* cited by examiner

Primary Examiner—Thomas Black
Assistant Examiner—Uyen Le
(74) Attorney, Agent, or Firm—Foley & Lardner

(57) ABSTRACT

A data calculator for calculating a data structure. The calculator has a data structure network storage section in which already generated data structures are stored and a calculation section used for generating each data structure based on other data structures. The other data structures are stored in a format by which dependence relationships between the stored data are detectable. A managing section is further provided. When revision of an existing data structure (or revision of a cell value or a frame), or of an existing calculation method is input, the managing section revises a target data and also revises data structures which depend on revised data with reference to the data structure network storage section.

5 Claims, 20 Drawing Sheets

FIG.14

| MAKE NEW TABLE | SUMMARY TABLE | =TABLE [YEAR × [BRANCH + "TOTAL"], "SALES VOLUME" + "NUMBER OF EMPLOYEES" + "VOLUME/EMPLOYEES" ] |
|---|---|---|
| SUMMARY TABLE | (?, VOLUME/EMPLOYEES) | = (?, "SALES VOLUME") / (?, "NUMBER OF EMPLOYEES") |

801, 802, 803

| BRANCH | 804 |
|---|---|
| TOKYO | |
| OSAKA | |

| YEAR | 805 |
|---|---|
| PREVIOUS YEAR | |
| PRESENT YEAR | |

806

| SALES VOLUME | = TABLE [BRANCH + "TOTAL", YEAR + "TOTAL"] | | |
|---|---|---|---|
| | PREVIOUS YEAR | PRESENT YEAR | TOTAL |
| TOKYO | 10 | 15 | 25 |
| OSAKA | 8 | 12 | 20 |
| TOTAL | 18 | 27 | 45 |

807

| NUMBER OF EMPLOYEES | = TABLE [BRANCH + "TOTAL", YEAR + "TOTAL"] | | |
|---|---|---|---|
| | PREVIOUS YEAR | PRESENT YEAR | TOTAL |
| TOKYO | 2 | 3 | 5 |
| OSAKA | 2 | 2 | 4 |
| TOTAL | 4 | 5 | 9 |

808

| SUMMARY TABLE | = TABLE [YEAR ? [BRANCH + "TOTAL"], "SALES VOLUME" + "NUMBER OF EMPLOYEES" + "VOLUME/EMPLOYEES" ] | | | | | |
|---|---|---|---|---|---|---|
| | PREVIOUS YEAR | | | PRESENT YEAR | | |
| | TOKYO | OSAKA | TOTAL | TOKYO | OSAKA | TOTAL |
| SALES VOLUME | 10 | 8 | 18 | 15 | 12 | 27 |
| NUMBER OF EMPLOYEES | 2 | 2 | 4 | 3 | 2 | 5 |
| VOLUME/EMPLOYEES | 5 | 4 | 4.5 | 5 | 6 | 5.4 |

| MAKE NEW TABLE | AGE TABLE | = TABLE ["NAME" + "HEIGHT" + "WEIGHT", SUMMARY TABLE (AGE, ?)] |
| --- | --- | --- |
| | AGE TABLE | (?ITEM, ?AGE) = SUMMARY TABLE (?ITEM, ?:SUMMARY TABLE (AGE, ?) == ?YEARS OLD) |

SUMMARY TABLE — 1001

| NAME | AGE | SEX | HEIGHT | WEIGHT |
| --- | --- | --- | --- | --- |
| TARO | 3 | MALE | 110 | 16 |
| MASAO | 2 | MALE | 100 | 15 |
| HANAKO | 3 | FEMALE | 95 | 15 |
| YOKO | 2 | FEMALE | 90 | 14 |

3 YEARS OLD = LIST [?:SUMMARY TABLE (AGE, ?)==3] — 1002

| TARO |
| --- |
| HANAKO |

MALE = LIST [?:SUMMARY TABLE (SEX, ?)=="MALE"] — 1003

| TARO |
| --- |
| MASAO |

AGE TABLE = TABLE ["NAME" + "HEIGHT" + "WEIGHT", SUMMARY TABLE (AGE, ?)] — 1004

| NAME | HEIGHT | WEIGHT |
| --- | --- | --- |
| TARO | 110 | 16 |
| HANAKO | 95 | 15 |
| MASAO | 100 | 15 |
| YOKO | 90 | 14 |

SEX TABLE = TABLE ["NAME" + "HEIGHT" + "WEIGHT", "MALE" + "FEMALE"] — 1005

| | NAME | HEIGHT | WEIGHT |
| --- | --- | --- | --- |
| MALE | TARO | 110 | 16 |
| | MASAO | 100 | 15 |
| FEMALE | HANAKO | 95 | 15 |
| | YOKO | 90 | 14 |

AVERAGE BY AGE = AVE [AGE TABLE ("HEIGHT" + "WEIGHT", ?)] — 1006

| | HEIGHT | WEIGHT |
| --- | --- | --- |
| 3 | 102.5 | 15.5 |
| 2 | 95 | 14.5 |

AVERAGE BY SEX = AVE [SEX TABLE ("HEIGHT" + "WEIGHT", ?)] — 1007

| | HEIGHT | WEIGHT |
| --- | --- | --- |
| 3 | 102.5 | 15.5 |
| 2 | 95 | 14.5 |

FIG.18 (PRIOR ART)

| | A | B | C | D | E |
|---|---|---|---|---|---|
| | D14 | | =D4/D9 | | |
| 1 | | | | | |
| 2 | | SALES VOLUME | PREVIOUS YEAR | PRESENT YEAR | TOTAL |
| 3 | | TOKYO | 10 | 15 | 25 |
| 4 | | OSAKA | 8 | 12 | 20 |
| 5 | | TOTAL | 18 | 27 | 45 |
| 6 | | | | | |
| 7 | | NUMBER OF EMPLOYEES | PREVIOUS YEAR | PRESENT YEAR | TOTAL |
| 8 | | TOKYO | 2 | 3 | 5 |
| 9 | | OSAKA | 2 | 2 | 4 |
| 10 | | TOTAL | 4 | 5 | 9 |
| 11 | | | | | |
| 12 | | VOLUME /EMPLOYEES | PREVIOUS YEAR | PRESENT YEAR | TOTAL |
| 13 | | TOKYO | 5 | 5 | 5 |
| 14 | | OSAKA | 4 | 6 | 5 |
| 15 | | TOTAL | 4.5 | 5.4 | 5 |
| 16 | | | | | |
| 17 | | | | | |

FIG.20 (PRIOR ART)

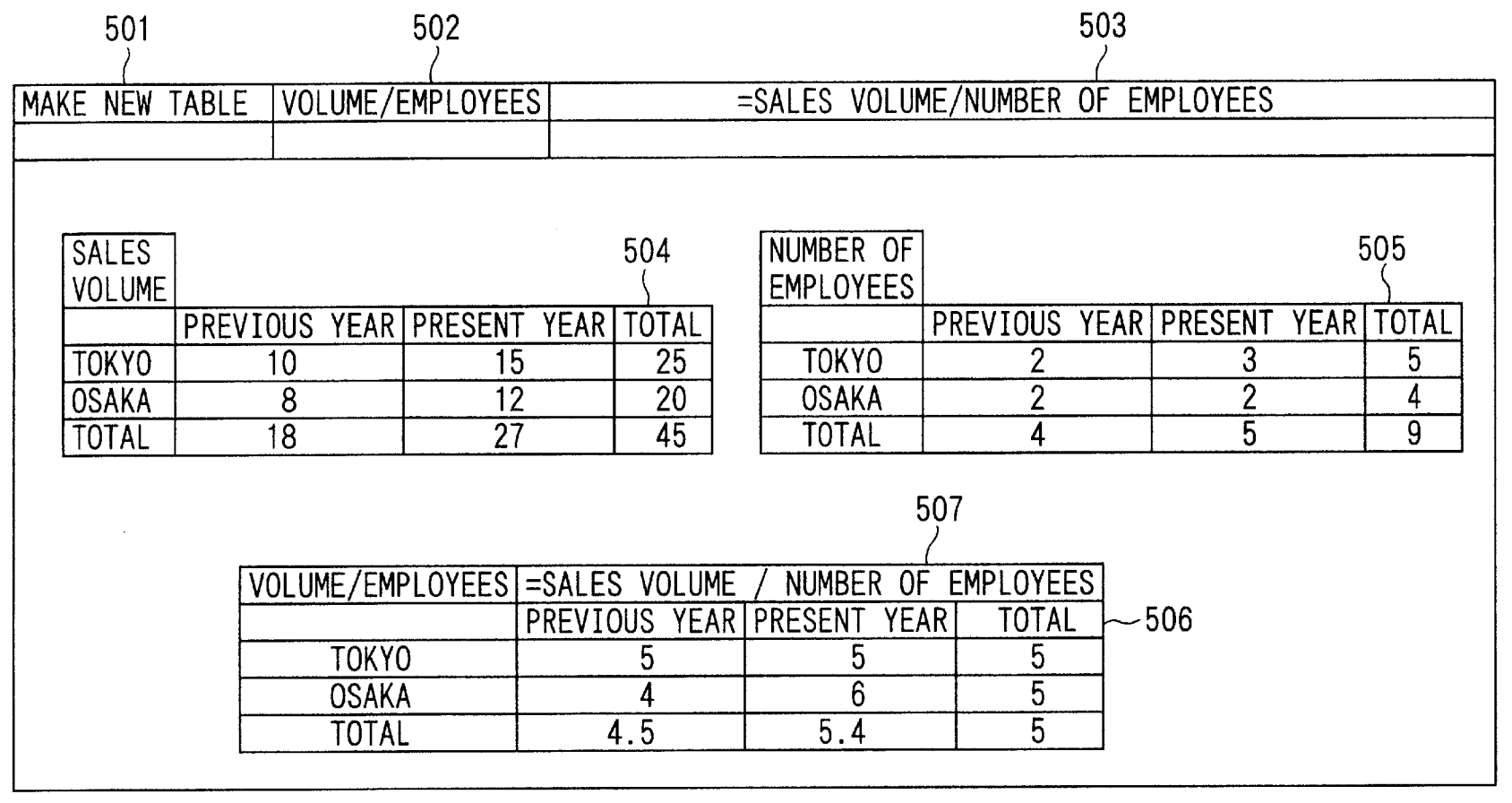

| MAKE NEW TABLE | VOLUME/EMPLOYEES | =SALES VOLUME/NUMBER OF EMPLOYEES |
|---|---|---|

| SALES VOLUME | PREVIOUS YEAR | PRESENT YEAR | TOTAL |
|---|---|---|---|
| TOKYO | 10 | 15 | 25 |
| OSAKA | 8 | 12 | 20 |
| TOTAL | 18 | 27 | 45 |

| NUMBER OF EMPLOYEES | PREVIOUS YEAR | PRESENT YEAR | TOTAL |
|---|---|---|---|
| TOKYO | 2 | 3 | 5 |
| OSAKA | 2 | 2 | 4 |
| TOTAL | 4 | 5 | 9 |

| VOLUME/EMPLOYEES =SALES VOLUME / NUMBER OF EMPLOYEES | PREVIOUS YEAR | PRESENT YEAR | TOTAL |
|---|---|---|---|
| TOKYO | 5 | 5 | 5 |
| OSAKA | 4 | 6 | 5 |
| TOTAL | 4.5 | 5.4 | 5 |

FIG.21 (PRIOR ART)

| | A | B | C | D | E | F | G | H | I | J |
|---|---|---|---|---|---|---|---|---|---|---|
| D10 | | | =C3 | | | | | | | |
| 1 | | | | | | | | | | |
| 2 | | SALES VOLUME | PREVIOUS YEAR | PRESENT YEAR | TOTAL | | NUMBER OF EMPLOYEES | PREVIOUS YEAR | PRESENT YEAR | TOTAL |
| 3 | | TOKYO | 10 | 15 | 25 | | TOKYO | 2 | 3 | 5 |
| 4 | | OSAKA | 8 | 12 | 20 | | OSAKA | 2 | 2 | 4 |
| 5 | | TOTAL | 18 | 27 | 45 | | TOTAL | 4 | 5 | 9 |
| 6 | | | | | | | | | | |
| 7 | | | | | | | | | | |
| 8 | | SUMMARY TABLE | | PREVIOUS YEAR | | | PRESENT YEAR | | TOTAL | |
| 9 | | | | TOKYO | OSAKA | TOTAL | TOKYO | OSAKA | TOTAL | |
| 10 | | SALES VOLUME | | 10 | 8 | 18 | 15 | 12 | 27 | |
| 11 | | NUMBER OF EMPLOYEES | | 2 | 2 | 4 | 3 | 2 | 5 | |
| 12 | | VOLUME /EMPLOYEES | | 5 | 4 | 4.5 | 5 | 6 | 5.4 | |
| 13 | | | | | | | | | | |

DATA CALCULATOR PERFORMING AUTOMATIC RECALCULATION BASED ON DATA STRUCTURE NETWORK

BACKGROUND OF THE INVENTION

1. Field of the Invention

The present invention relates to a technique for inputting a plurality of data and a method for calculating these data into a data structure as a table, and outputting calculated results.

This application is based on Patent Application No. Hei 9-194821 filed in Japan, the contents of which are incorporated herein by reference.

2. Description of the Related Art

Conventional data calculators can be classified into two types: a spread-sheet type in which a working table is managed so as to maintain dependence relationships between data by editing the values of cells in the table and by editing a method for calculating values of the cells based on positional information of the cells, and a non-limited processing type in which calculation of data structures is possible by editing the data structures and inputting a calculation method but dependence relationships are not maintained.

The former spread-sheet type calculator comprises a cell data editing section for realizing input, display, and revising operations of a working table and values of the cells in the working table; a calculation method editing section for realizing input, display, and revising operations of a method for performing a calculation between cells by using positional information of the cells; a managing section for managing a cell network in which the cells are regarded as nodes and the calculation method is regarded as an ark, and for maintaining dependence relationships between data structures as inputs or outputs of calculation; and a calculating section for performing calculations between the cells.

When cell data and a calculation method are respectively provided from the cell data editing section and the calculation method editing section to the managing section, the managing section calculates the data of a cell as an output of a calculation according to the calculation method by using the newest data of a cell as an input of the calculation, and displays a calculated result via the cell data editing section.

FIG. 17 is a block diagram showing a structural example of conventional spread-sheet type data calculator 201. As shown in the figure, data calculator 201 consists of cell data editing section 202, calculation method editing section 203, managing section 204, calculating section 205, and working-table/cell-network storage section 206. The working-table/cell-network storage section 206 stores a cell network and a working table, and is managed by the managing section 204.

The cell data editing section 202 realizes a display operation (see arrow 2A in FIG. 17), an input operation (see arrow 2B), and a revising operation (see arrow 2C) with respect to cell data, and if cell data are changed by an input or revising operation, the changed cell data is communicated to managing section 204 (see arrow 2H).

When a change of cell data is communicated (see arrow 2H), the managing section 204 updates the cell network stored in the cell network storage section (see arrow 2M). After that, the managing section detects cells which must be recalculated, a necessary calculation method, and the data of the cells used for calculation, by referring to the cell network (see arrow 2L), and provides detected information to calculating section 205 as recalculation information (see arrow 2K).

In calculating section 205, necessary calculations are performed according to the recalculation information. Cell data as calculated results are given to managing section 204 (see arrow 2J), and managing section 204 informs cell data editing section 202 of the cell data (see arrow 2G). In this way, cell data editing section 202 displays the new cell data in a display section (not shown) (see arrow 2A).

The calculation method editing section 203 realizes a display operation (see arrow 2D), an input operation (see arrow 2E), and a revising operation (see arrow 2F). When the calculation method is changed according to an input or revising operation, the new calculation method is communicated to managing section 204 (see arrow 2I).

In this way, managing section 204 updates the cell network (see arrow 2M), and then detects cells which must be recalculated, a necessary calculation method, and data of the cells used for calculation, by referring to the cell network (see arrow 2L), and provides detected information to calculating section 205 as recalculation information (see arrow 2K).

In calculating section 205, necessary calculations are performed according to the recalculation information. Cell data as calculated results are given to managing section 204 (see arrow 2J), and managing section 204 informs cell data editing section 202 of the cell data (see arrow 2G). In this way, cell data editing section 202 displays the new cell data in the display section (see arrow 2A).

FIG. 18 is a diagram showing an example of the display screen in the conventional spread-sheet type data calculator as shown in FIG. 17. This example relates to two branch offices (Tokyo and Osaka) of a company and shows results of calculations in which sales volume per an employee is calculated for each branch office based on data relating to the sales volume and the number of employees in both branch offices for the present and previous year.

In the display screen as shown in FIG. 18, selected cell display label 401 for indicating a cell for which data or a calculation method is edited; selected cell edit entry 402 for performing input, edit, or display of cell data or a calculation method; and working table 411 are displayed.

The working table 411 has a structure of a two-dimensional array of cells, and comprises line headers 404, column headers 403, and scroll bars 408 and 410. A user can select a cell (i.e., selected cell) 409 to be edited by using a pointing device like a mouse, a cursor key of a keyboard, or the like. A display effect like a shade is added to selected cell 409 so as to be identifiable at a glance. When each of tables 405–407 is made using an area of working table 411, an optional function which modifies the display of the ruled lines is used so as to make the structure of the tables easily recognizable.

The index indicating coordinate values of selected cell 409 is always displayed in selected cell display label 401. A user can edit the table by selecting a cell and editing a value or a formula relating to the cell via the selected cell edit entry 402. In the example of FIG. 18, cell 409 (the position thereof is "D14")is selected, and formula "=D4/D9" is input. In this way, calculated result "6" is displayed in selected cell 409.

Here, the formula "=D4/D9" indicates that selected cell 409 is set to be a value obtained by dividing the value of cell D4 by the value of cell D9. The cells D4 and D9 appearing in this formula can be designated using the relative coordinates with respect to the selected cell 409. In this example, cell D4 indicates a cell existing in the same column as selected cell 409 and ten lines above the line of cell 409, while cell D9 indicates a cell existing in the same column as selected cell 409 and five lines above the line of cell 409. That is, the calculation method of the value of cell D14 can be defined using relative coordinates such as "dividing the value of a cell ten lines above the target cell by the value of a cell five lines above the target cell". In this way, the value of each cell of table 407 of the sales volume per an employee, the third table in FIG. 18, (that is, the values of the cells belonging to a rectangular area defined by three horizontal cells and three vertical cells, specified by two corner cells C13 and E15) can be calculated using the same calculation method. Therefore, by copying the relevant calculation method from a cell to another cell in turn, calculation methods used for these nine cells can easily be designated.

In the spread-sheet type calculator, in order to maintain dependence relationships based on the designated calculation methods, when the value of a cell is changed, the values of other cells in a dependence relationship with the changed cell are automatically recalculated and changed. For example, in the case shown in FIG. 18, when the value of cell D4 or cell D9 is changed, the value of sell D14 is automatically recalculated and changed according to the formula "=D4/D9".

On the other hand, the non-restricted processing type calculator consists of a data structure editing section for realizing input, display, and revising operations with respect to a data structure such as a list, table, graph, or the like; a calculation method input section for realizing an input operation of a method for calculating a new data structure based on the existing data structure; a managing section for managing a list of data structures; and a calculating section for performing a calculation relating to a relevant data structure. If cell data or a calculation method is provided from the data structure editing section or the calculation method editing section to the managing section, a data structure is calculated via the calculating section according to the present data structure and calculation method, and a calculated result is displayed by the data structure editing section.

FIG. 19 is a block diagram showing an example of the conventional non-restricted processing type data calculator (301). As shown in the figure, data calculator 301 consists of data structure editing section 302, calculation method input section 303, managing section 304, calculating section 305, and data structure list storage section 306 which is managed by the managing section 304.

The data structure editing section 302 realizes a display operation (see arrow 3A), an input operation (see arrow 3A), and a revising operation (see arrow 3C) with respect to a data structure such as a list, table, graph, or the like. When the data structure is changed according to the input or revising operation, the data structure editing section 302 informs managing section 304 of the changed data structure (see arrow 3F).

When the managing section 304 is informed that the data was changed (see arrow 3F), the managing section updates the content of data structure storage section 306 but does not perform a recalculation or the like.

A calculation method for calculating a new data structure from the data structure which was already established is input via the calculation method input section 303 (see arrow 3D), and the input section 303 communicates the input calculation method to managing section 304 (see arrow 3G). In this way, managing section 304 acquires the present data structure as an input for a relevant calculation from data structure list storage section 306 (see arrow 3J), and provides it to calculating section 305 together with a calculation method (see arrow 3I).

In the calculating section 305, the relevant calculation is performed based on the given data structure and calculation method, and the data structure as a calculated result is transferred to managing section 304 (see arrow 3H). The managing section 304 registers the data structure, provided from the calculating section 305, to data structure list storage section 306 (see arrow 3K), and simultaneously communicates the data structure to data structure editing section 302 (see arrow 3E). The data structure editing section 302 displays the new data structure in a display device (not shown).

FIG. 20 is a diagram showing an example of the display screen in data calculator 301 as shown in FIG. 19. This example relates to data for two branch offices (Tokyo and Osaka) of a company and shows results of calculations in which sales volume per an employee is calculated for each branch office, based on data relating to the sales volume and the number of employees in both branch offices for the present and previous year, as in the example shown in FIG. 18.

The display screen as shown in FIG. 20 includes parts such as menu 501 by which a user selects the kind of calculation method of the data structure, name entry 502 for designating a name of a new data structure, and each data structure (or table) 504–506. These data structures are displayed in a format of the multi-window system. Here, "SALES VOLUME" table 504 and "NUMBER OF EMPLOYEES" table 505 are data structures which a user has already input.

The user made a new table 506 (i.e., "VOLUME/ EMPLOYEES")by selecting the item "MAKE NEW TABLE" in the menu. The used calculation method is designated by a formula "=SALES VOLUME/NUMBER OF EMPLOYEES". This method is for generating a table having the same headers as the tables 504 (the sales volume) and 505 (the number of employees). The value of each target cell in generated table 506 is a result obtained by dividing the value of a cell in table 504 (the sales volume) at a position corresponding to the target cell by the value of a cell of table 505 (the number of employees) also at a position corresponding to the target cell. This calculation method is shown in an upper area 507 in table 506 ("SALES VOLUME/NUMBER OF EMPLOYEES").

In the above-described conventional spread-sheet type data calculator, a relationship between plural data can be indicated only based on positional relationships of the cells in the working table. Therefore, it is difficult to indicate complicated relationships between various data. This problem will be explained in detail with reference to an example shown in FIG. 21.

FIG. 21 shows an example of the display screen in the spread-sheet type data calculator shown in FIG. 17, as the example shown in FIG. 18. In the example of FIG. 21, summary table 703 is calculated based on "SALES VOLUME" table 701 and "NUMBER OF EMPLOYEES" table 702, as in the example shown in FIG. 18. The arrows in FIG. 21 indicate relationships between target cells of table 701 of the sales volume and of table 702 of the number of employees and corresponding cells of table 703 which are set to be the same value of each target cell. For example, the formula for calculating cell D10 is "=C3", and the cell D10 is set to be the same value as that of cell C3 of table 701 of the sales volume. In the defined formulas for calculating the eight cells in summary table 703, each formula must independently refer to corresponding cells of table 701 of the sales volume and table 702 of the number of employees. Therefore, a simple method such as copying a formula as shown in the example of FIG. 18 cannot be used in this case. This is because the structure of desired table 703 differs from those of existing table 701 of the sales volume and table 702 of the number of employees; therefore, the structure of table 703 cannot be simply represented only using positional relationships between the cells.

In the spread-sheet type data calculator, the dependence relationships are maintained based on the used calculation methods of the cells. Therefore, when the -value of a cell is changed, the values of other cells which must also be changed are automatically changed. For example, in FIG. 18, if the value of the sales volume of the previous year for the Tokyo branch office (i.e., cell C3) is changed, the values of cells E3, C5, E5, C13, E13, C15, and E15 are automatically changed in accordance with the above change. However, if it is necessary to newly add data for the Nagoya branch office, or to also add data of the year before the previous year, then the user must carry out a major revision of the data.

Additionally, in the conventional spread-sheet type data calculator, as shown in FIG. 18, three tables such as "SALES VOLUME" table 405, "NUMBER OF EMPLOYEES" table 406 and "SALES VOLUME/NUMBER OF EMPLOYEES" table 407 must be arranged in a working table 411. Therefore, it is inconvenient if it is necessary to calculate many tables and to separately display or print the tables.

As explained above, in the conventional spread-sheet type data calculator, no method other than the method in which formulas are determined based on positional relationships between the cells in the working table can be used; thus, it is difficult to calculate a new table from existing tables when the new table has no corresponding positional relationship with the existing tables. Additionally, it is inconvenient when it is necessary to calculate many tables and to separately display or print the tables, and a big revision is necessary when a data structure itself must be changed.

On the other hand, as the conventional non-restricted processing type data calculator has no structure for maintaining dependence relationships based on cells or calculation methods of the table, the table as calculated results must be recalculated according to a change of the value of a cell in which original data is stored or a change of the structure of the table. For example, when the sales volume of the previous year for the Tokyo branch office is changed in the example shown in FIG. 20, table 506 must be deleted and then the same calculations must be performed again. Also, when a new branch office or a new target year is added to each of table 504 of the sales volumes and table 505 of the number of employees, similar recalculations must be performed. As described above, the conventional non-restricted processing type data calculator has a problem in which recalculation is necessary according to a change of the value of a cell or of the structure of the table.

SUMMARY OF THE INVENTION

In consideration of the above circumstances, the present invention has an objective to easily generate a new data structure based on various exiting data structures, and to easily cope with a change of an existing data structure.

Therefore, the present invention provides a data calculator comprising:

a data structure network storage section in which one or more already generated data structures, a calculation method used for generating each data structure based on one or more other data structures, and said one or more other data structures are stored in a format by which dependence relationships between these stored data are detectable; and a managing section, wherein when a calculation method is input which indicates the generation of a new data structure based on one or more already generated data structures, the managing section generates a new data structure based on the above calculation method and one or more already generated data structures stored in the data structure network storage section, and stores the generated new data structure and the above-mentioned calculation method into the data structure network storage section in a format in which dependence relationships between the newly stored data structure and calculation method, and the already-stored data structures and calculation method are detectable;

when revision of the calculation method is directed, the managing section revises the calculation method which is stored in the data structure network storage section and for which revision was directed, and the managing section also revises all data structures, which depend on the calculation method for which revision was directed, based on the data structures and calculation method stored in the data structure network storage section; and when revision of a cell value or a frame of the already generated data structure is directed, the managing section revises the data structure which is stored in the data structure network storage section and for which revision was directed, and the managing section also revises all data structures, which depend on the data structure for which revision was directed, based on the data structures and calculation method stored in the data structure network storage section.

According to the above structure, it is possible to easily generate a new data structure based on various exiting data structures, and to easily cope with a change of an existing data structure.

In order to easily calculate a value of a cell by using another cell in the same data structure, the present invention also provides a data calculator comprising:

a data structure cell network storage section in which one or more already generated data structures, a calculation method used for generating each data structure based on one or more other data structures, said one or more other data structures, a cell pattern indicating each cell which was set using a value of another cell in the same data structure, a calculation method used for calculating a value of the cell indicated by the cell pattern are stored in a format by which dependence relationships between these stored data are detectable; and a managing section, wherein when a calculation method is input which indicates the generation of a new data structure based on one or more already generated data structures, the managing section generates a new data structure based on the above calculation method and one or more already generated data structures stored in the data structure cell network storage section, and stores the generated new data structure and the above calculation method into the data structure cell network storage section in a format in which dependence relationships between the newly stored data structure and calculation method, and the already-stored data structures and calculation method are detectable;

when revision of the calculation method is directed, the managing section revises the calculation method which is stored in the data structure cell network storage section and for which revision was directed, and the managing section also revises all data structures, which depend on the calculation method for which revision was directed, based on the data structures and calculation method stored in the data structure cell network storage section;

when revision of a cell value or a frame of the already generated data structure is directed, the managing section revises the data structure which is stored in the data structure cell network storage section and for which revision was directed, and the managing section also revises all data structures, which depend on the data structure for which revision was directed, based on the data structures and calculation method stored in the data structure cell network storage section;

when a cell pattern indicating a cell of a data structure and a calculation method for calculating a value of the cell indicated by the cell pattern are input, the managing section performs the calculation of the value of the cell indicated by the cell pattern according to the above calculation method, and sets the relevant cell in the data structure to the calculated value, and the managing section stores the cell pattern and the calculation method in a format in which dependence relationships between the newly stored cell pattern and calculation method, and the already-stored data structures, cell pattern, and calculation method are detectable; and when revision of a value of a cell in the already generated data structure is directed, the managing section revises the value of the cell which is stored in the data structure cell network storage section and for which revision was directed, and the managing section also revises the value of each cell indicated by each cell pattern which depends on a calculation method relating to the above direction of revision.

According to the above structure, it is possible to easily calculate a value of a cell in the data structure.

In addition, the present invention also provides storage media storing computer programs for making a computer function as the above-mentioned managing sections.

BRIEF DESCRIPTION OF THE DRAWINGS

FIG. 14 is a diagram showing an example of the display screen of display section 908.

FIG. 15 is a diagram showing another example of the display screen of display section 908.

FIG. 18 is a diagram showing an example of the display screen in data calculator 201.

FIG. 20 is a diagram showing an example of the display screen in data calculator 301.

FIG. 21 is a diagram for explaining a problem of the conventional spread-sheet type data calculator 201.

DESCRIPTION OF THE PREFERRED EMBODIMENTS

The embodiments of the present invention will be explained in detail with reference to the drawings.

Figure 1:
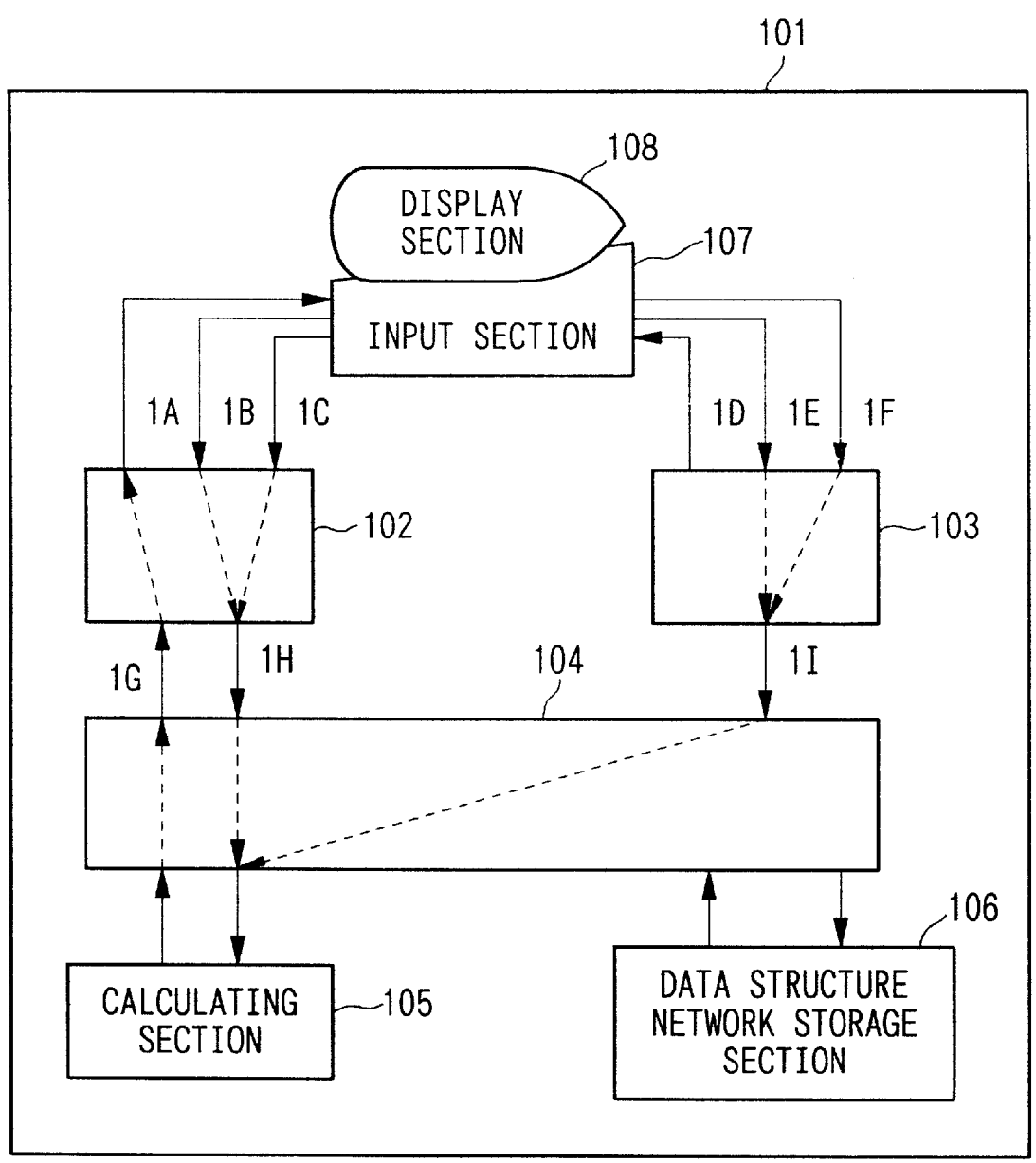
FIG. 1 is a block diagram of the first embodiment according to the present invention.

FIG. 1 is a block diagram of data calculator 101 as an embodiment according to the present invention. The data calculator 101 comprises data structure editing section 102, calculation method editing section 103, managing section 104, calculating section 105, data structure network storage section 106, input section 107 such as a keyboard, mouse, or the like, and display section 108 such as a CRT.

The data structure editing section 102 has the following functions such that:

(i) when a user intends to input a new data structure as a list, table, graph, or the like, via input section 107 (see arrow 1B), the section 102 transfers change information (see arrow 1H), which includes the name and the substance of the input data structure, to managing section 104, (ii) when a user intends to revise a data structure via input section 107 (see arrow 1C), the section 102 transfers change information, which includes the name and the substance of the revised data structure, to managing section 104, and (iii) when change information is transferred from managing section 104 (see arrow 1G), the section 102 changes the display relating to the data structure according to the transferred information (see arrow 1A).

The calculation method editing section 103 has the following functions such that:

(i) when a user inputs a calculation method for generating a new data structure and a name of the new data structure via input section 107 (see arrow 1E), the section 103 transfers change information (see arrow 1I), which includes the above input data, to managing section 104, and (ii) when a user revises the calculation method which was already input via input section 107 (see arrow 1F), the section 103 transfers change information (see arrow 1I), which includes the revised calculation method and the name of the revised data structure, to managing section 104.

In the data structure network storage section 106, generated data structures, calculation methods used for generating the above data structures, and other existing data structures used for generating the above data structures are stored in a format by which dependence relationships between these data can be detected. In the present embodiment, each piece of information is stored using a data structure network format in which data structures are regarded as "nodes" while calculation methods are regarded as "arcs".

The calculating section 105 has a function of performing calculations between data structures.

The managing section 104 has a function such that when change information (see arrow 1H or 1I) is provided from data structure editing section 102 or calculation method editing section 103, the section 104 performs a recalculation (using calculating section 105) necessary for always maintaining a situation in which data in the data structure as an output result of a calculation according to the newest calculation method equals the result data of a calculation using the newest data in the data structure as an input of the above calculation using the newest method. The managing section also has a function of redisplaying results of recalculation via data structure editing section 102 (see arrows 1G and 1A).

Figure 2:
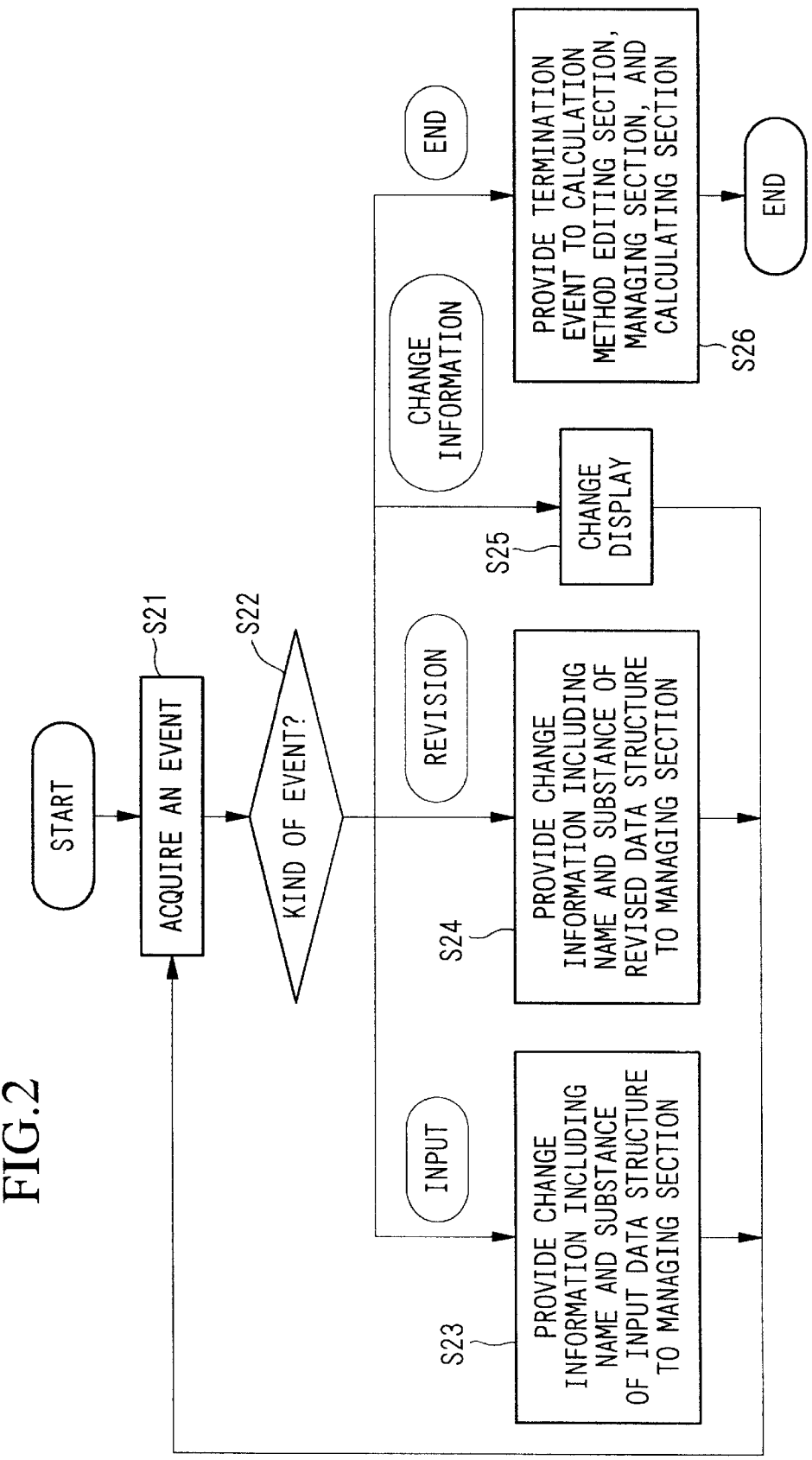
FIG. 2 is a flowchart showing an operational example of data structure editing section 102.
Figure 3:
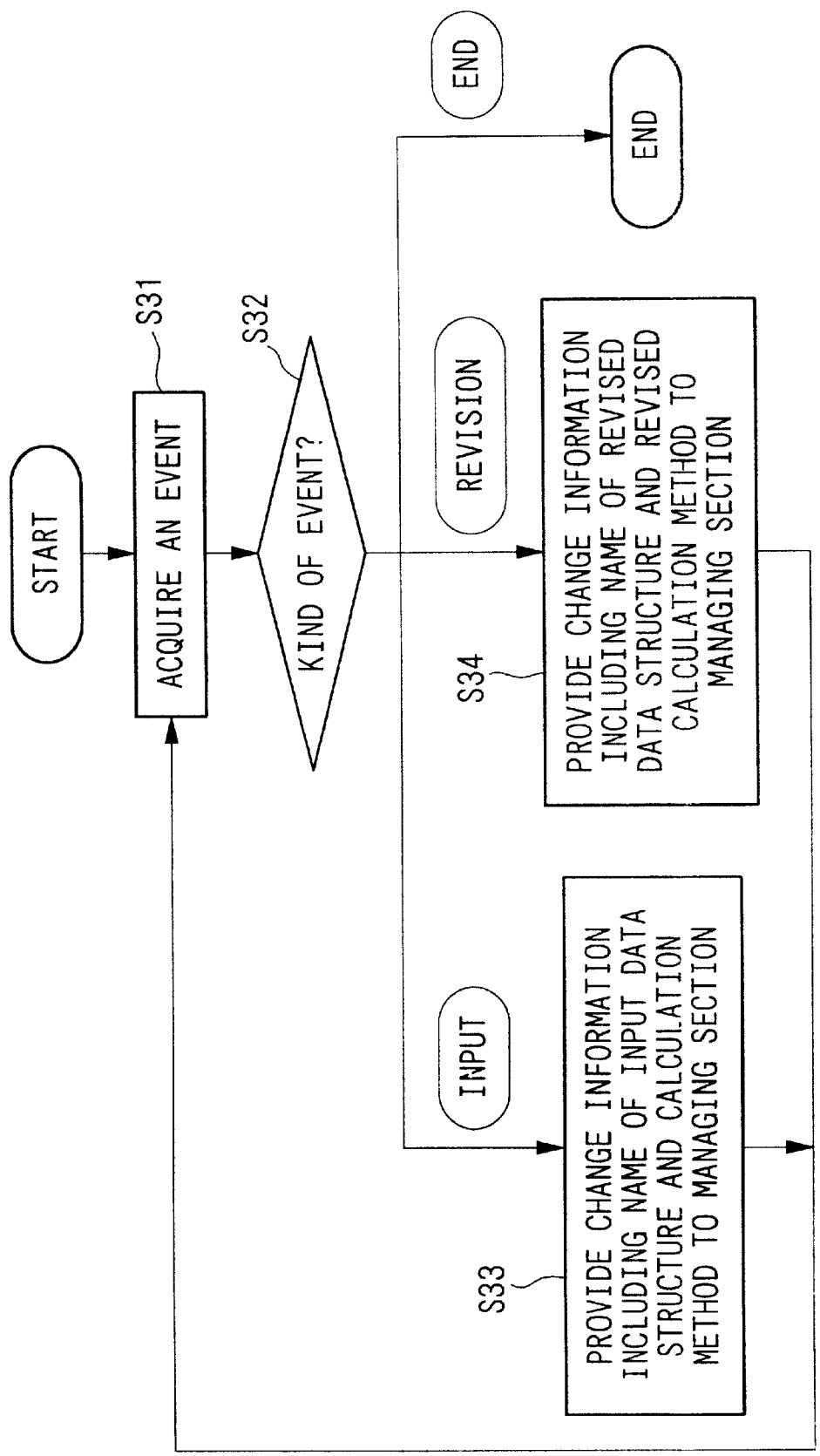
FIG. 3 is a flowchart showing an operational example of calculation method editing section 103.
Figure 4:
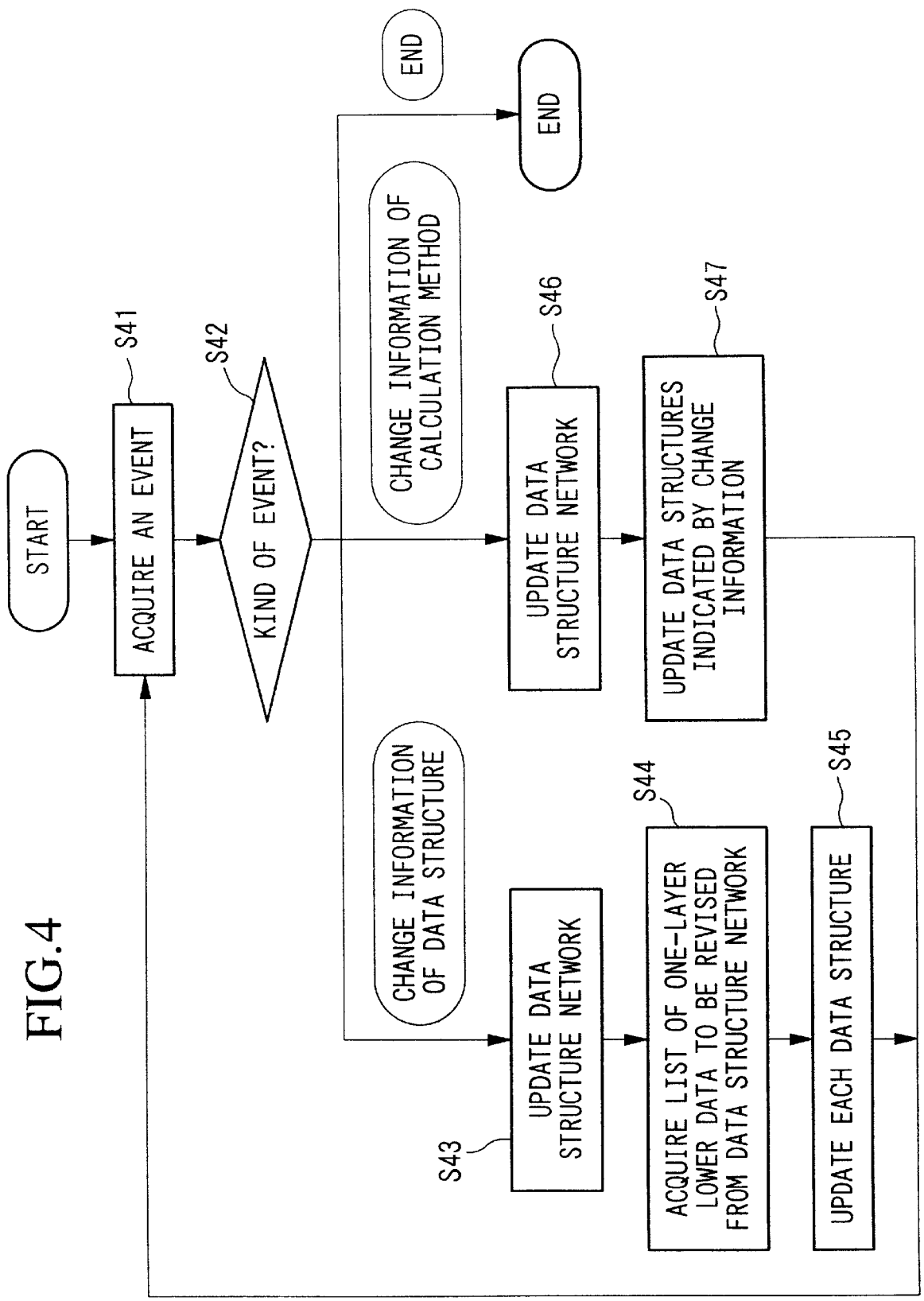
FIG. 4 is a flowchart showing an operational example of managing section 104.
Figure 5:
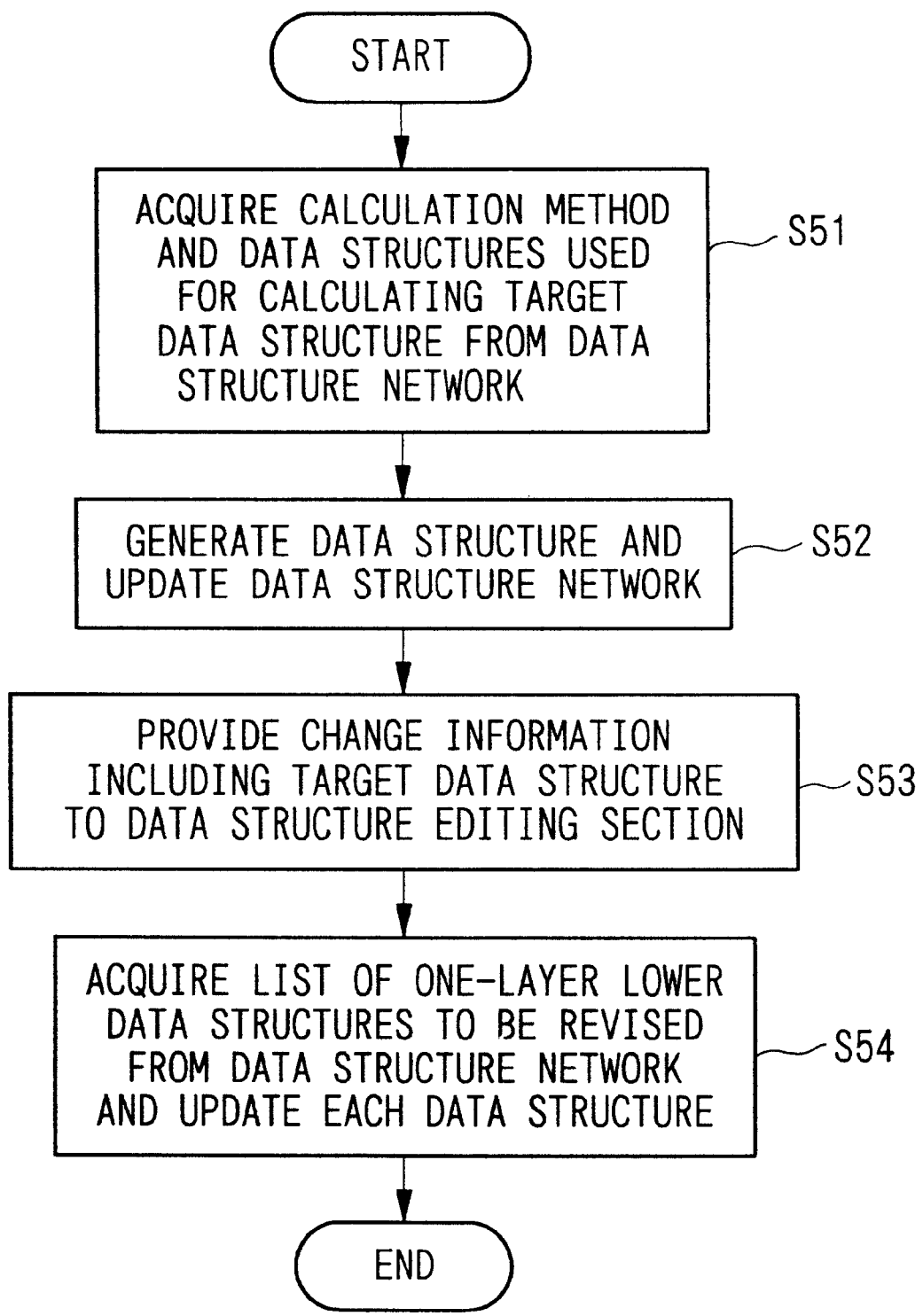
FIG. 5 is a flowchart showing an updating process performed by managing section 104.
Figure 6B:
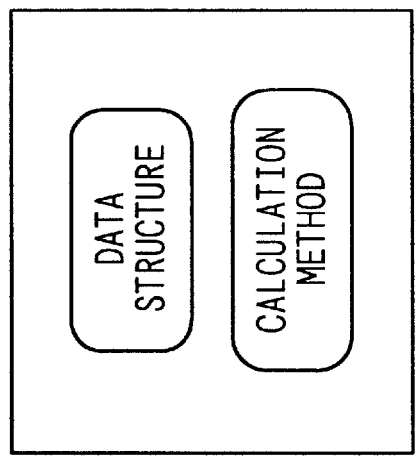
FIG. 6B shows a general data storage situation in the section 106.
Figure 6A:
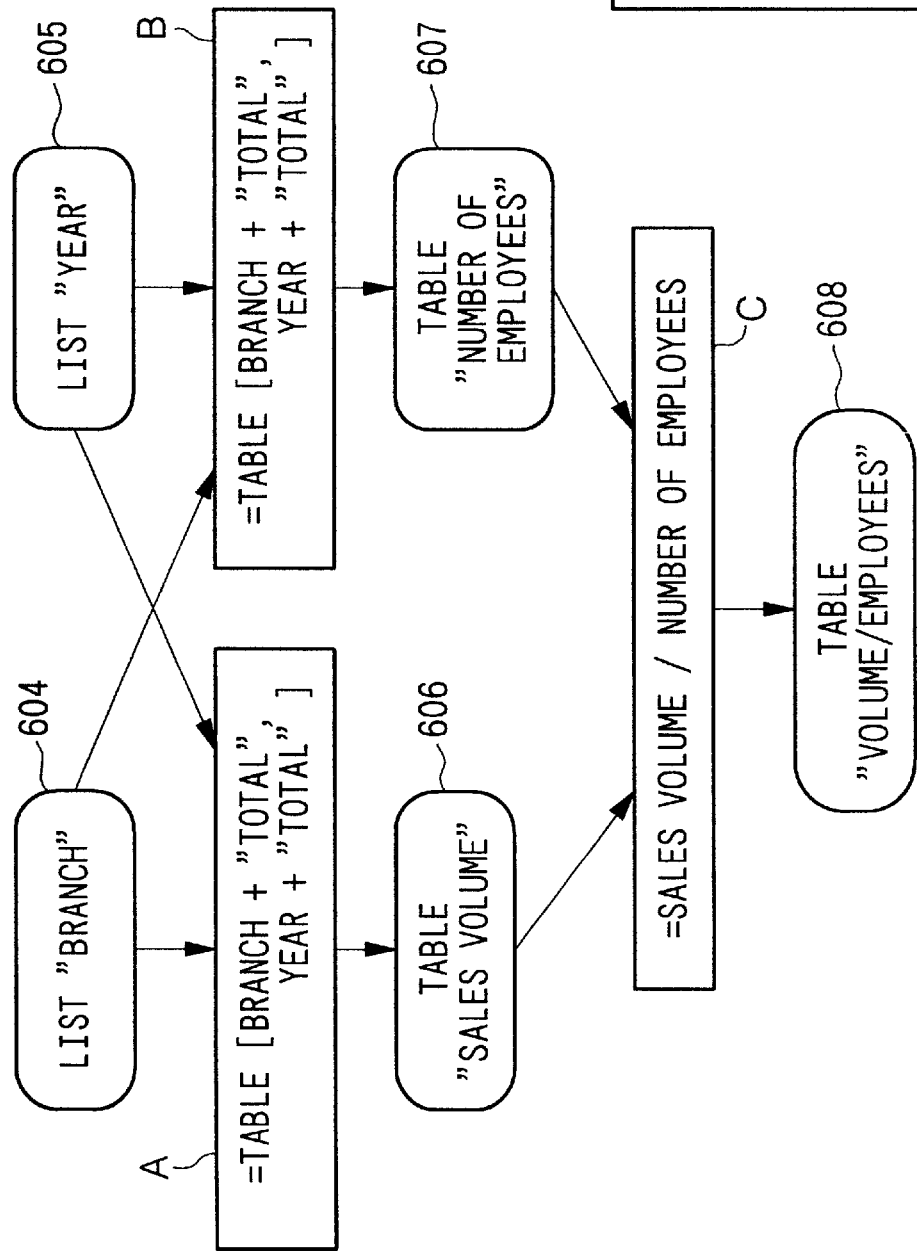
FIG. 6A is a diagram showing a structural example of data structure network storage section 106.
Figure 7:
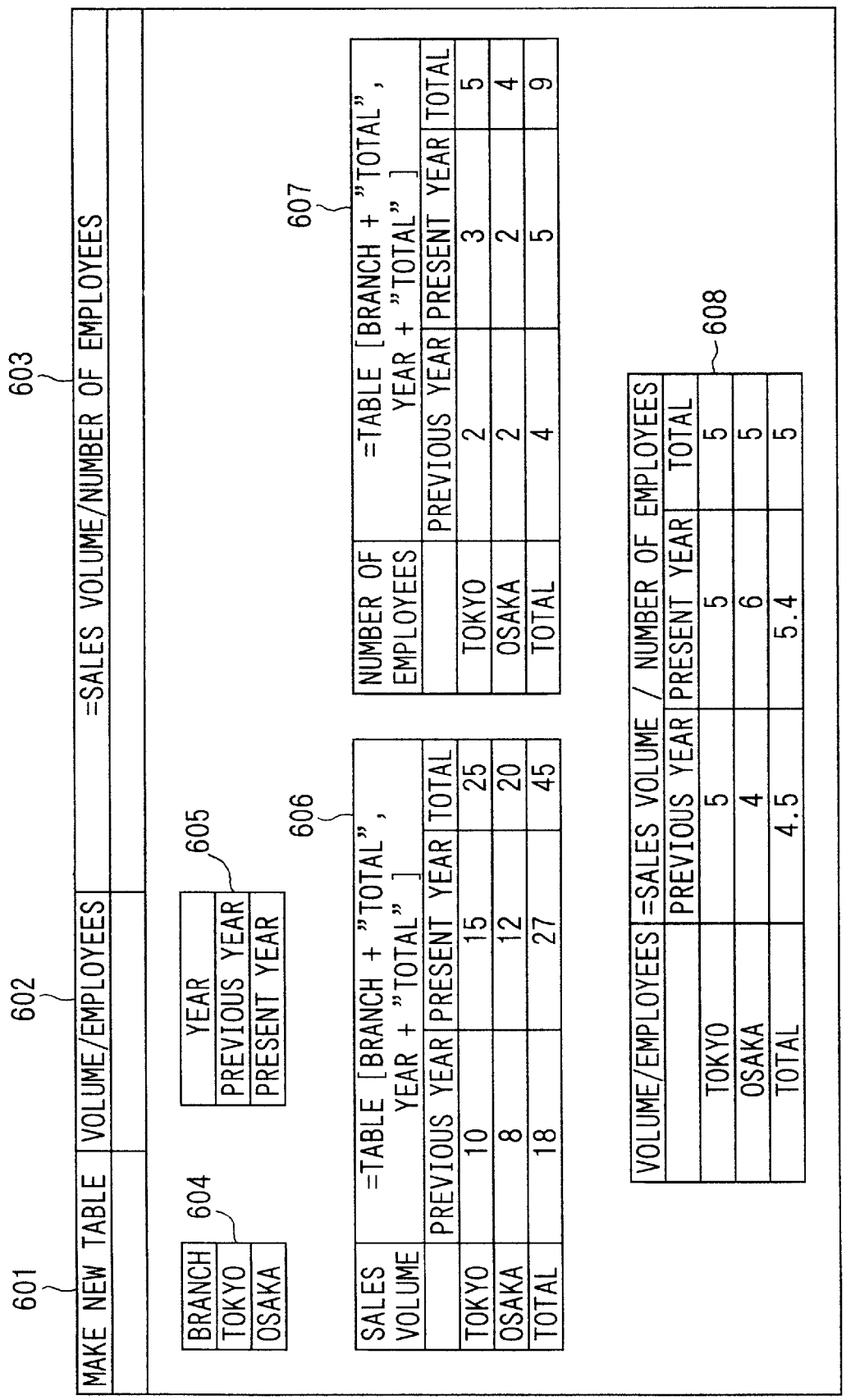
FIG. 7 is a diagram showing an example of the display screen of display section 108.

FIG. 2 is a flowchart showing an operational example of data structure editing section 102, FIG. 3 is a flowchart showing an operational example of calculation method editing section 103, FIG. 4 is a flowchart showing an operational example of managing section 104, FIG. 5 is a flowchart showing an updating process performed by managing section 104, FIG. 6A is a diagram showing a structural example of data structure network storage section 106, FIG. 6B shows a general data storage situation in the section 106, and FIG. 7 is a diagram showing an example of the display screen of display section 108. Hereinbelow, operations of the present embodiment will be explained with reference to each figure.

The display screen shown in FIG. 7, as in the examples shown in FIGS. 18 and 20, relates to data for two branch offices of a company and indicates results of calculations in which sales volume per an employee is calculated for each branch office, based on data relating to the sales volume and the number of employees in both branch offices for the present and previous year.

The display screen as shown in FIG. 7 includes parts such as menu 601 by which a user designates a kind of calculation methods of the data structure, name entry 602 for designating a name of a data structure to be newly designated, and lists 604, 605 and tables 606, 607, 608 as data structures. These data structures are displayed in a format of the multi-window system.

First, a user inputs list 604 having name "BRANCH" by using input section 107 (see arrow 1B).

When list 604 of name "BRANCH" is input (see steps S21 and S22), data structure editing section 102 provides change information, which includes the name "BRANCH" and substantial data of the list 604, to managing section 104 (see step S23).

When the managing section 104 receives the above change information from data structure editing section 102 (see steps S41 and S42 in FIG. 4), section 104 updates the content of data structure network storage section 106 (see step S43). In this example, as shown in FIG. 6A, substantial data of list 604 of name "BRANCH" are stored into data structure network storage section 106. After that, the managing section 104 acquires a list of data structures which depend on list 604 and which belong to a layer being one layer lower than that of list 604 based on the data structure network stored in the data structure network storage section 106 (see step S44). The managing section 104 then tries to perform an updating process with respect to each acquired data structure (see step S45). However, in this example, no data structure depending on list 604 exists; thus, no updating process relating to the data structure is performed.

After that, the user inputs list 605 of name "YEAR" by using input section 107 (see arrow 1B). Accordingly, similar operations to those explained above are performed in data structure editing section 102 and managing section 104, and list 605 of name "YEAR" is stored in data structure network storage section 106 as shown in FIG. 6A.

The user then selects "MAKE NEW TABLE" in menu 601 and inputs to name entry 602 a name "SALES VOLUME" of a table to be newly generated, and further inputs to calculation method entry 603 a calculation method "=TABLE [BRANCH+"TOTAL", YEAR+"TOTAL"]". In this way, the user directs that a table 606 of name "SALES VOLUME" be newly made (see arrow 1E). The above calculation method "=TABLE [BRANCH+"TOTAL", YEAR+"TOTAL"]" indicates to make a table structure having the elements included in list 605 and name "TOTAL" as item names in the horizontal line (i.e., as column headers) and also having the elements included in 604 and name "TOTAL" as item names in the vertical line (i.e., as row headers).

When the calculation method editing section 103 is instructed to generate table 606 (see steps S31 and S32 in FIG. 3), the section 103 provides change information (1I), which includes the name "SALES VOLUME" of table 606 and the above-described calculation method "=TABLE [BRANCH+"TOTAL", YEAR+"TOTAL"]", to managing section 104 (see step S33).

When the managing section 104 receives the above change information (1I) from calculation method editing section 103 (see steps S41 and S42 in FIG. 4), the section 104 updates the content of data structure network storage section 106 (see step S46). In this example, managing section 104 stores calculation method "=TABLE [BRANCH+"TOTAL", YEAR+"TOTAL"]" A into data structure network storage section 106, as information in connection with lists 604 and 605, as shown in FIG. 6A.

After that, the managing section 104 performs an updating process with respect to the data structure indicated by the change information (1I) (i.e., table 606 of name "SALES VOLUME")(see step S47).

Operations performed in this updating process of step S47 will be explained in detail with reference to the flowchart of FIG. 5.

First, with reference to the data structure network, a calculation method and data structures used for making table 606 of name "SALES VOLUME" are acquired (see step S51). In the case of this example, the managing section 104 acquires calculation method "=TABLE [BRANCH+"TOTAL", YEAR+"TOTAL"]" A and lists 604 and 605.

After that, the managing section 104 makes table 606 of name "SALES VOLUME" based on calculation method A and lists 604 and 605 acquired in step S51, and further updates the content of data structure network storage section 106 (see step S52). In the case of this example, managing section 104 generates table 606 and adds the table to the content of data structure network storage section 106 in connection with calculation method A, as shown in FIG. 6A. Here, if the same data structure as the generated data structure has already been stored in data structure network storage section 106, the "same" one is replaced with the data structure generated in step S52. Furthermore, if cell values are necessary when a data structure is generated in step S52, then the managing section 104 provides a relevant calculation method and the data structure itself to calculation section 105 so as to make the section 105 calculate the value of each cell, and completes the data structure using the calculated results.

The managing section 104 then provides change information (1G), which includes substantial data of table 606 generated in step S52, to data structure editing section 102 (see step S53).

When the above change information (1G) is provided to the data structure editing section 102 (see steps S21 and S22 in FIG. 2), the section 102 displays the newly generated table 606 in display section 108 (see step S25). Here, only header parts (that is, only the frame part) of table 606 are displayed and the value of each cell is not shown.

The managing section 104 then refers to the data structure network and acquires the list of one-layer lower data structures so as to perform an updating process with respect to the data structures shown by the list (see step S54). However, in this example, no data structure depending on table 606 exists; thus, no updating process is performed.

After the user makes table 606 of name "SALES VOLUME", the user selects "MAKE NEW TABLE" in menu 601 and inputs a name "NUMBER OF EMPLOYEES" of table 607 to be newly generated into name entry 602, and further inputs calculation method "=TABLE [BRANCH+"TOTAL", YEAR+"TOTAL"]" into calculation method entry 603. In this way, the user directs that table 607 of name "NUMBER OF EMPLOYEES" be newly generated (see arrow 1E).

Accordingly, operations similar to those explained above are performed. As a result, calculation method "=TABLE [BRANCH+"TOTAL", YEAR+"TOTAL"]" B is stored into data structure network storage section 106 as information in connection with lists 604 and 605, as shown in FIG. 6A. Additionally, table 607 of name "NUMBER OF EMPLOYEES" is stored in connection with calculation method B, and the frame of table 607 is displayed in display section 108.

After that, the user selects "CHANGE DATA STRUCTURE" in menu 601 and inputs name "SALES VOLUME" of table 606 in name entry 602, and inputs the value of each cell of table 606.

When the values of the cells of table 606 are input (see steps S21 and S22 in FIG. 2), the data structure editing section 102 provides change information (1H), which includes the name "SALES VOLUME" of table 606 and the table 606 in which the value of each cell has already been input, to managing section 104 (see step S23).

When the managing section 104 receives the above change information (1H) (see steps S41 and S42 in FIG. 4), the section 104 updates the data structure network (see step S43). In the case of this example, managing section 104 replaces table 606 (having only a frame) stored in the data structure network storage section 106 with the substance of table 606 (in which the values of the cells have already been input), which is included in change information (1H).

After the user inputs the value of each cell of table 606, the user next inputs a value of each cell of table 607 of name "NUMBER OF EMPLOYEES" in the display screen of display section 108. In this way, operations similar to those explained above are performed, and table 607 (having only a frame part) stored in data structure network storage section 106 is replaced with table 607 each cell of which has already been set.

Lastly, the user selects "MAKE NEW TABLE" again in menu 601 and inputs a name "VOLUME/EMPLOYEES" of table 608 to be newly generated into name entry 602, and further inputs calculation method "=SALES VOLUME/ NUMBER OF EMPLOYEES", which indicates how to make table 608, into calculation method entry 603, by which the user directs that the table 608 be generated. Here, the above calculation method "=SALES VOLUME/NUMBER OF EMPLOYEES" indicates to make a table which has the same item names (i.e., the same headers) as those of tables 606 and 607 of names "SALES VOLUME" and "NUMBER OF EMPLOYEES", and each cell of which is set to be a value obtained by dividing the value of a corresponding cell existing in the corresponding position in table 606 of "SALES VOLUME" by the value of a corresponding cell at the corresponding position in table 607 of "NUMBER OF EMPLOYEES".

When it is directed that table 608 of name "VOLUME/ EMPLOYEES" be generated (see steps S31 and S32), the calculation method editing section 103 provides change information (1I), which includes the name "volume/ employees" of table 608 and the above calculation method "SALES VOLUME/NUMBER OF EMPLOYEES", to managing section 104 (see step S33).

When the managing section 104 receives the above change information (1I) from calculation method editing section 103 (see steps S41 and S42 in FIG. 4), the section 103 updates the data structure network (see step S46). In this example, the managing section 104 stores calculation method "SALES VOLUME/NUMBER OF EMPLOYEES" C as information in connection with tables 606 and 607, as shown in FIG. 4A (see step S46).

The managing section 104 then performs an updating process with respect to the data structure (i.e., table 608 of name "VOLUME/EMPLOYEES")shown by the change information (1I) (see step S47).

In the updating process in step S47, managing section 104 first acquires a calculation method and data structures necessary for making table 608 with reference to the data structure network, as shown in the flowchart of FIG. 5 (see step S51). In this example, managing section 104 acquires calculation method "SALES VOLUME/NUMBER OF EMPLOYEES" C and tables 606 and 607 of names "SALES VOLUME" and "NUMBER OF EMPLOYEES".

The managing section 104 then generates table 608 of name "VOLUME/EMPLOYEES" based on method C and tables 606 and 607 acquired in step S51 and updates the data structure network (see step S52). In this example, the value of each cell is necessary when table 608 is generated. Therefore, managing section 104 provides calculation method C and tables 606 and 607 to calculating section 105 so as to make the section 105 calculate the value of each cell of table 608, and makes table 608 by using calculated results. In addition, into data structure network storage section 106, generated table 608 of name "VOLUME/ EMPLOYEES" is stored in connection with the calculation method C, as shown in FIG. 6A.

After that, managing section 104 provides change information (1G) including table 608, generated in step S52, to data structure editing section 102 (see step S53).

When the data structure editing section 102 receives the above change information (1G) (see steps S21 and S22 in FIG. 2), the section 102 displays the newly generated table 608 in display section 108 (see step S25).

The managing section 104 then refers to the data structure network, and acquires a list of one-layer lower data structures and tries to perform an updating process for the data structures indicated by the list (see step S54). However, in this example, no data structure being dependent on table 608 exists; thus, no updating process is performed.

According to the above operations, table 608 of name "VOLUME/EMPLOYEES", which shows a sales volume per an employee, is generated, as shown in FIG. 7.

After that, if it is necessary to add a new item of Nagoya branch office to table 608, the user adds element "NAGOYA" to list 604 on the display screen of display section 108.

When "NAGOYA" is added to list 604 (see steps S21 and S22), the data structure editing section 102 provides change information (1H), which includes the name "BRANCH" and substantial data of list 604, to managing section 104 (see step is S24).

When the managing section 104 receives the change information (1H) (see steps S41 and S42 in FIG. 4), the section 104 updates the content of the data structure network storage section 106 (see step S43). In the operation of this example, list 604 which has already been stored (and which does not include data of Nagoya) is replaced with new list 604 in the above change information (1H) (which includes data of Nagoya).

After that, the managing section 104 refers to data structure network storage section 106 and acquires a list of one-layer lower data structures which depend on list 604 of name "BRANCH" (see step S44). In this example, the acquired list includes names "SALES VOLUME" and "NUMBER OF EMPLOYEES".

The managing section 104 then performs an updating process with respect to tables 606 and 607 of names "SALES VOLUME" and "NUMBER OF EMPLOYEES" (see step S45). In this way, a line of header "NAGOYA" is added to each of tables 606 and 607 of names "SALES VOLUME" and "NUMBER OF EMPLOYEES" (see steps S51–S53 in FIG. 5). Furthermore, by performing the process in step S54, a line of header "NAGOYA" is added to table 608 of "VOLUME/EMPLOYEES". After that, when the user provides a value to each cell in the line "NAGOYA" of each table 606 and 607, operations similar to those explained above are performed and each cell in line "NAGOYA" of table 608 of name "VOLUME/EMPLOYEES" is set to be a suitable value.

On the other hand, while the screen as shown in FIG. 7 is displayed in display section 108, a user may select "CHANGE CALCULATION METHOD" in menu 601, provide a name "SALES VOLUME" of table 606 in name entry 602, whose calculation method is going to be revised, and provide a revised calculation method in calculation method entry 603. Accordingly, revision of the calculation method is indicated, and the following operations are performed.

When the calculation method editing section 103 is instructed to revise the calculation method (see steps S31 and S32 in FIG. 3), the section 103 provides change information, which includes the name "SALES VOLUME" of revised table 606 and the revised calculation method, to managing section 104 (see step S34).

In this way, the managing section 104 replaces calculation method A as shown in FIG. 6A with the revised calculation method (see steps S41, 42, and 46 in FIG. 4). After that, the managing section 104 revises table 606 according to the revised calculation method, and replaces the table stored in data structure network storage section 106 with the revised table and displays the revised table in display section 108 (see steps S51–S53 in FIG. 5). The managing section 104 then performs the process in step S54, by which the value of each cell of table 608 of name "VOLUME/EMPLOYEES" is recalculated.

On the other hand, if the user hopes to finish the processing of the data calculator, the user inputs a finish command using input section 107. In this way, data structure editing section 102 provides a termination event to calculation method editing section 103, managing section 104, and calculating section 105 (see steps S21, S22, and S26) so as to complete the operations of each section 103, 104, and 105. The data structure editing section 102 then terminates the operations of itself.

In the present embodiment, each data structure is managed using a format of the multi-window system; thus, it is convenient when it is necessary to calculate multiple data structures and to respectively display or print the plural data. On the other hand, similar to ordinary multi-window systems, the present system has functions such as changing of a window size, transforming a window into an icon, and moving a window. Therefore, it is possible to arrange and display only the desired data structures in an easily observed format.

Additionally, in the present embodiment, not only the following operation is possible in which if the value of any cell of tables 606 and 607 of names "SALES VOLUME" and "NUMBER OF EMPLOYEES" is changed, then the value of each corresponding cell of table 608 of name "VOLUME/EMPLOYEES" is automatically recalculated and changed, but also the following operation is possible in which even if a structural change relating to tables 606–608 (i.e., a change of their frames) is caused according to a change of addition or deletion of an element in lists 604 and 605, each dependence relationship can be maintained according to automatic recalculation. Therefore, there occurs an effect such that revision by a user is unnecessary in this case.

As explained above, the present system has functions of designation of each calculation method between data structures and of recalculation based on dependence relationships of the data structures, by which complex relationships between various kinds of data can be represented and it is possible to easily cope with a change of the data structure.

Figure 8:
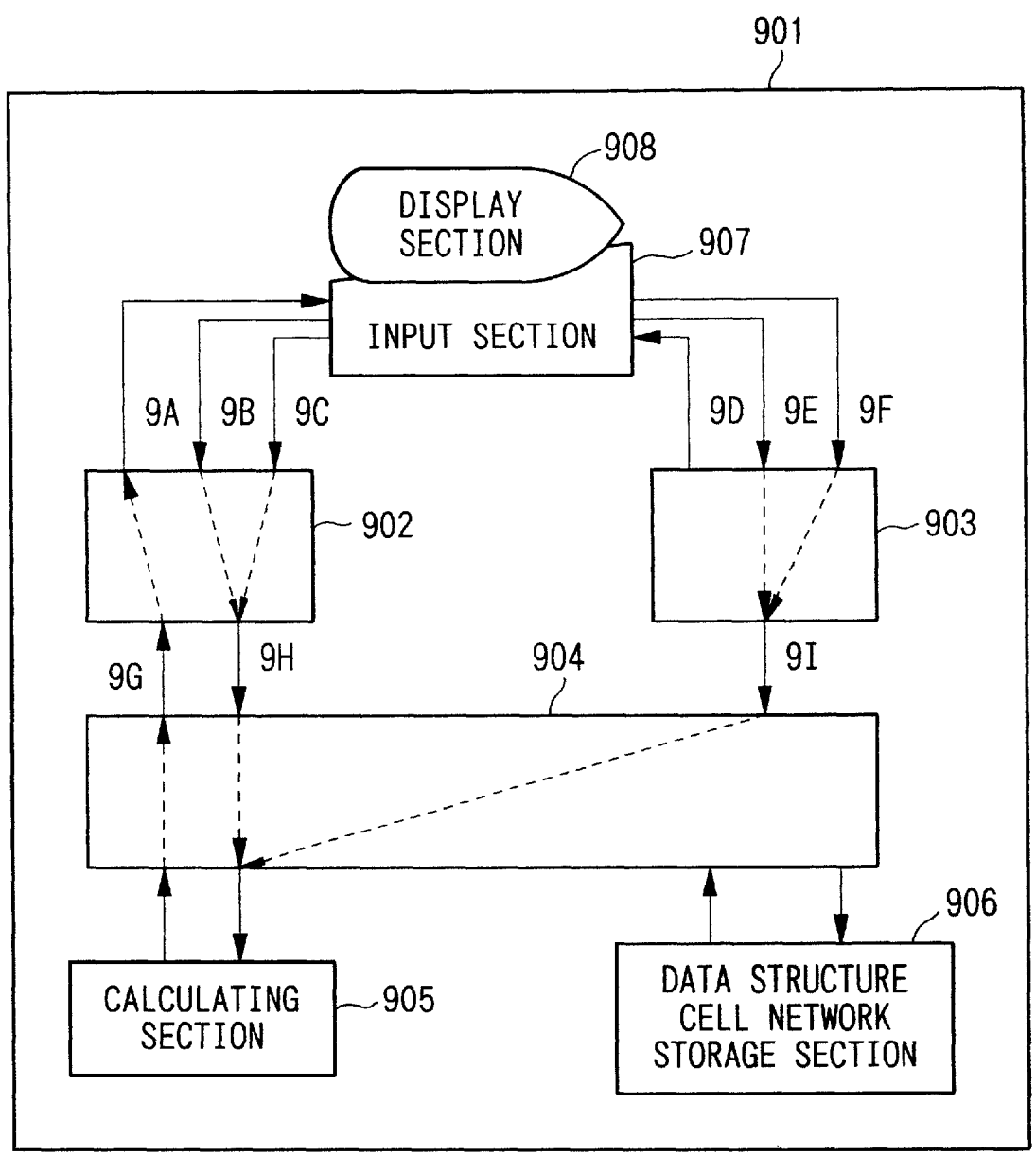
FIG. 8 is a block diagram of another embodiment according to the present invention.

FIG. 8 is a block diagram showing another embodiment of the data calculator (901) according to the present invention. The data calculator 901 comprises data structure cell editing section 902, calculation method editing section 903, managing section 904, calculating section 905, data structure cell network storage section 906, input section 907 such as a keyboard, mouse, or the like, and display section 908 such as a CRT.

The data structure cell editing section 902 has the following functions such that:

(i) when a user indicates the input of a new data structure such as a list, table, or a graph by using input section 907 (see arrow 9B), the section 902 provides change information (see arrow 9H), which includes the name and substantial data of the input data structure, to managing section 904;

(ii) when a user indicates revision of a target data structure by using input section 907 (see arrow 9C), the section 902 provides change information (9H), which includes the name and substantial data of the revised data structure, to managing section 904;

(iii) when a user indicates revision of a target cell by using input section 907 (see arrow 9C), the section 902 provides change information (9H), which includes information indicating the revised cell (that is, the name of the data structure and the position of the cell) and the relevant value, and (iv) when change information (see arrow 9G) is provided from managing section 904, the section 902 changes the display of data structures based on this change information (see arrow 9A).

The calculation method editing section 903 has the following functions such that:

(i) when a user inputs a calculation method for generating a new data structure and a name of the data structure to be newly generated by using input section 907 (see arrow 9E), the section 903 provides change information (see arrow 9I), which includes the input data, to managing section 904;

(ii) when a user revises the calculation method, which was already input so as to generate the data structure which was also already input (see arrow 9F), the section 903 provides change information (see arrow 9I), which includes the revised calculation method and the name of the revised data structure, to managing section 904:

(iii) when a user inputs a cell pattern indicating a cell to be set to a value, a calculation method for calculating the value of the cell indicated by the cell pattern, and the name of the data structure in which the cell indicated by the above cell pattern exists (see arrow 9E), the section 903 provides change information (9I), which includes these input data, to managing section 904; and (iv) when a user revises the calculation method, which was already input so as to calculate the value of each cell, by using input section 907, the section 903 provides change information (see arrow 9I), which includes the revised calculation method and information indicating the revised cell pattern, to managing section 904.

In the data structure cell network storage section 906, each generated data structure, the calculation method used when the above data structure was generated based on another data structure, said another data structure, a cell pattern indicating a cell which was set to a value using a value of another cell existing in the same data structure, and the calculation method used for calculating the value of the cell indicated by the above cell pattern are stored in a format by which the dependence relationships of these stored data can be known. In the present embodiment, the above information is stored using a format of the data structure cell network in which the data structures and cell patterns are regarded as nodes, while each calculation method is regarded as an arc.

The calculating section 905 has a function of performing calculations between the data structures and also between the cells.

The managing section 904 has the following functions such that when change information (see arrows 9H and 9I) is provided from data structure cell editing section 902 and calculation method editing section, the section 904 instructs calculating section 905 to perform the recalculation necessary for always maintaining a situation in which data in the data structure or the cell as an output result of a calculation according to the newest calculation method equals the result data of a calculation using the newest data in the data structure or the cell as an input of the above calculation using the newest method, and that section 904 makes the calculated results be redisplayed using data structure cell editing section 902 (see arrow 9A).

Figure 9:
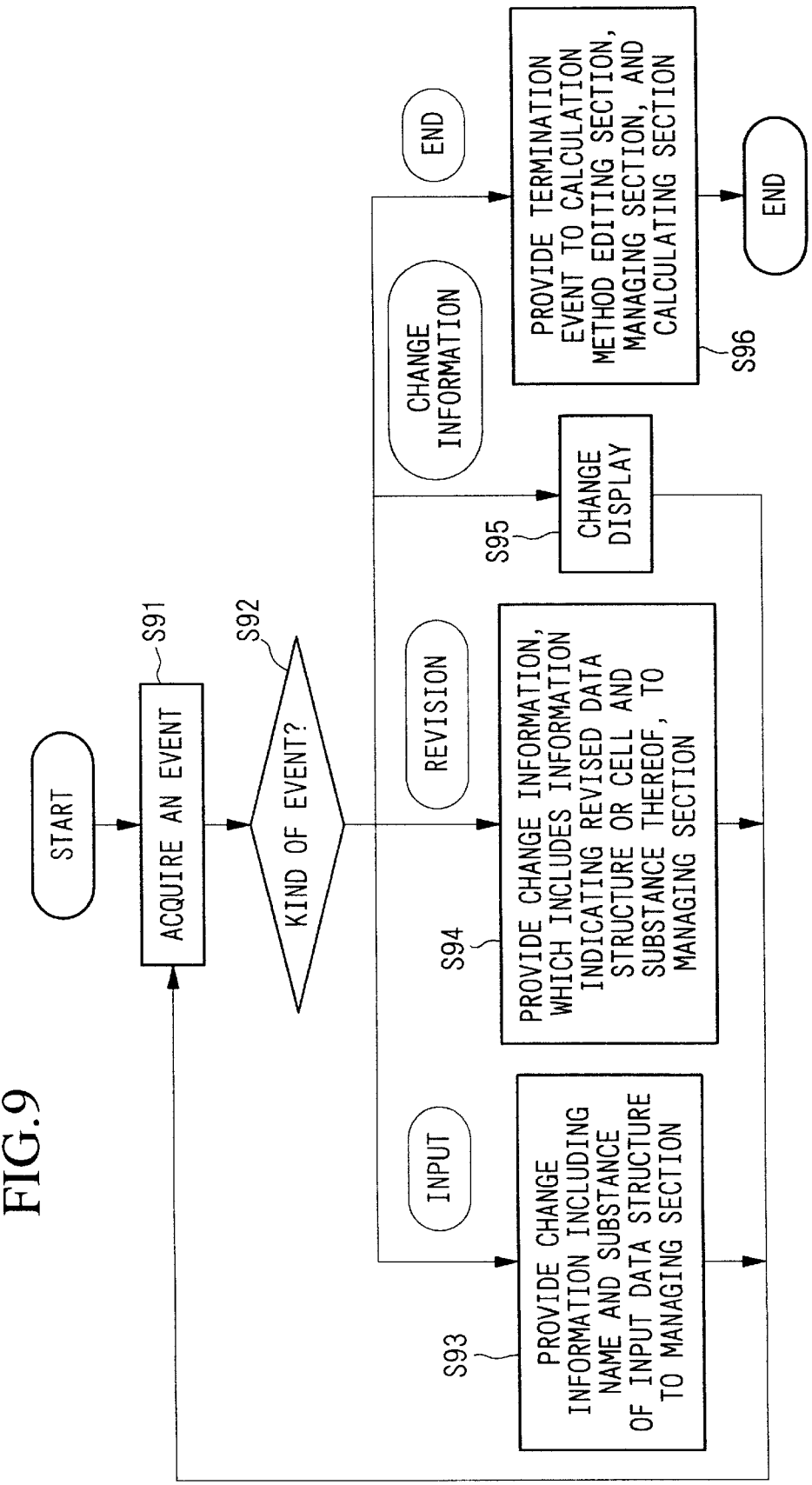
FIG. 9 is a flowchart showing an operational example of data structure cell editing section 902.
Figure 10:
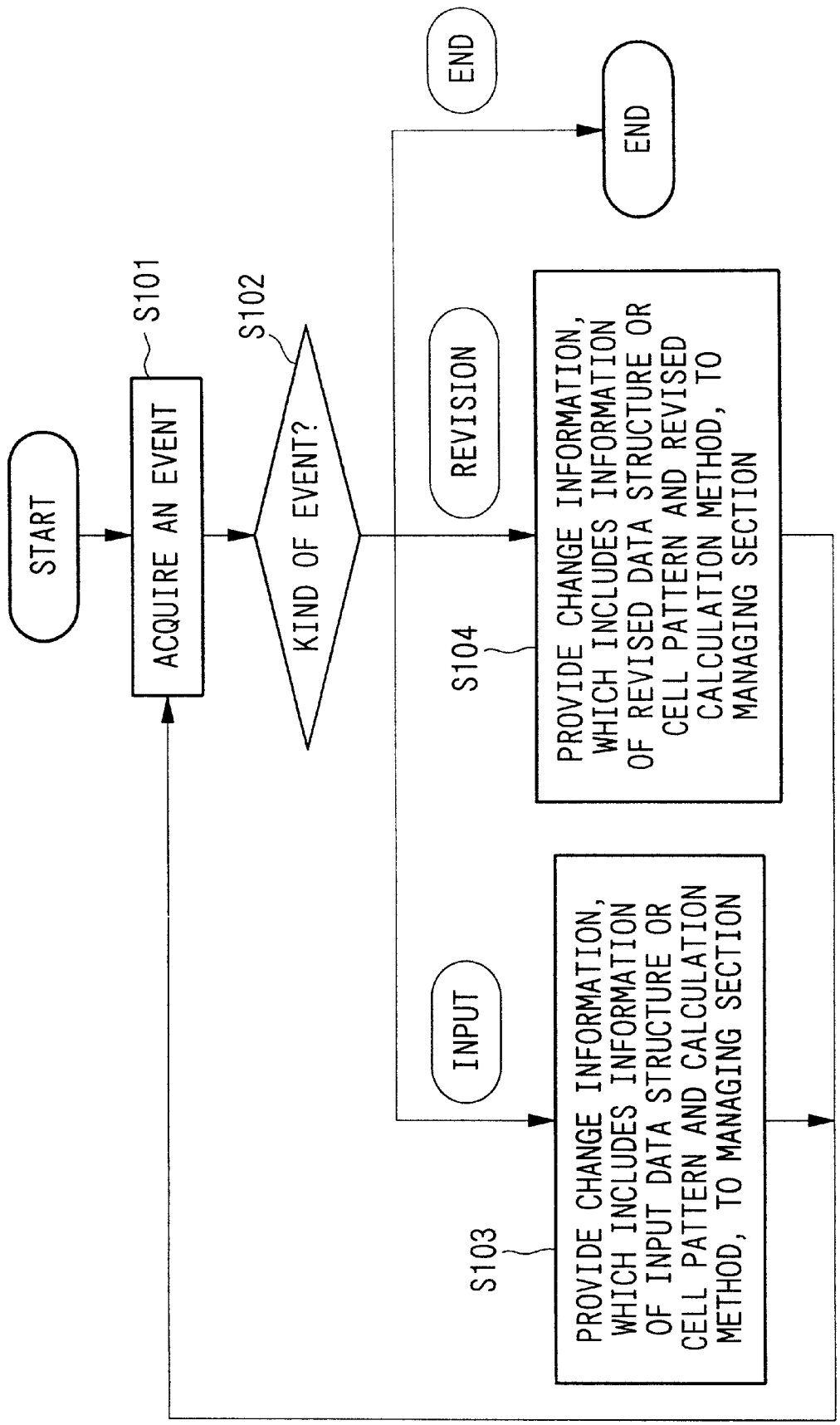
FIG. 10 is a flowchart showing an operational example of calculation method editing section 903.
Figure 11:
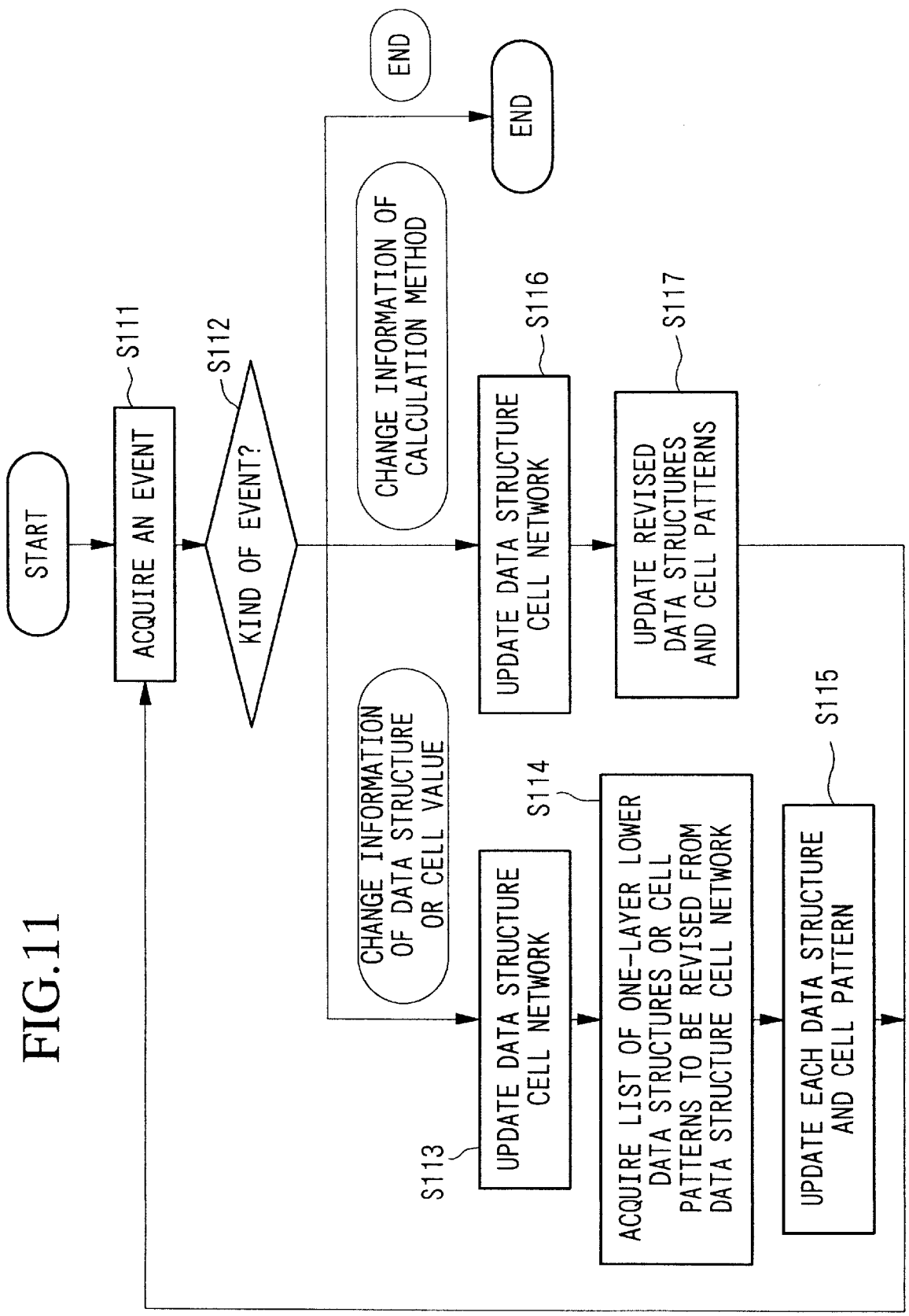
FIG. 11 is a flowchart showing an operational example of managing section 904.
Figure 12:
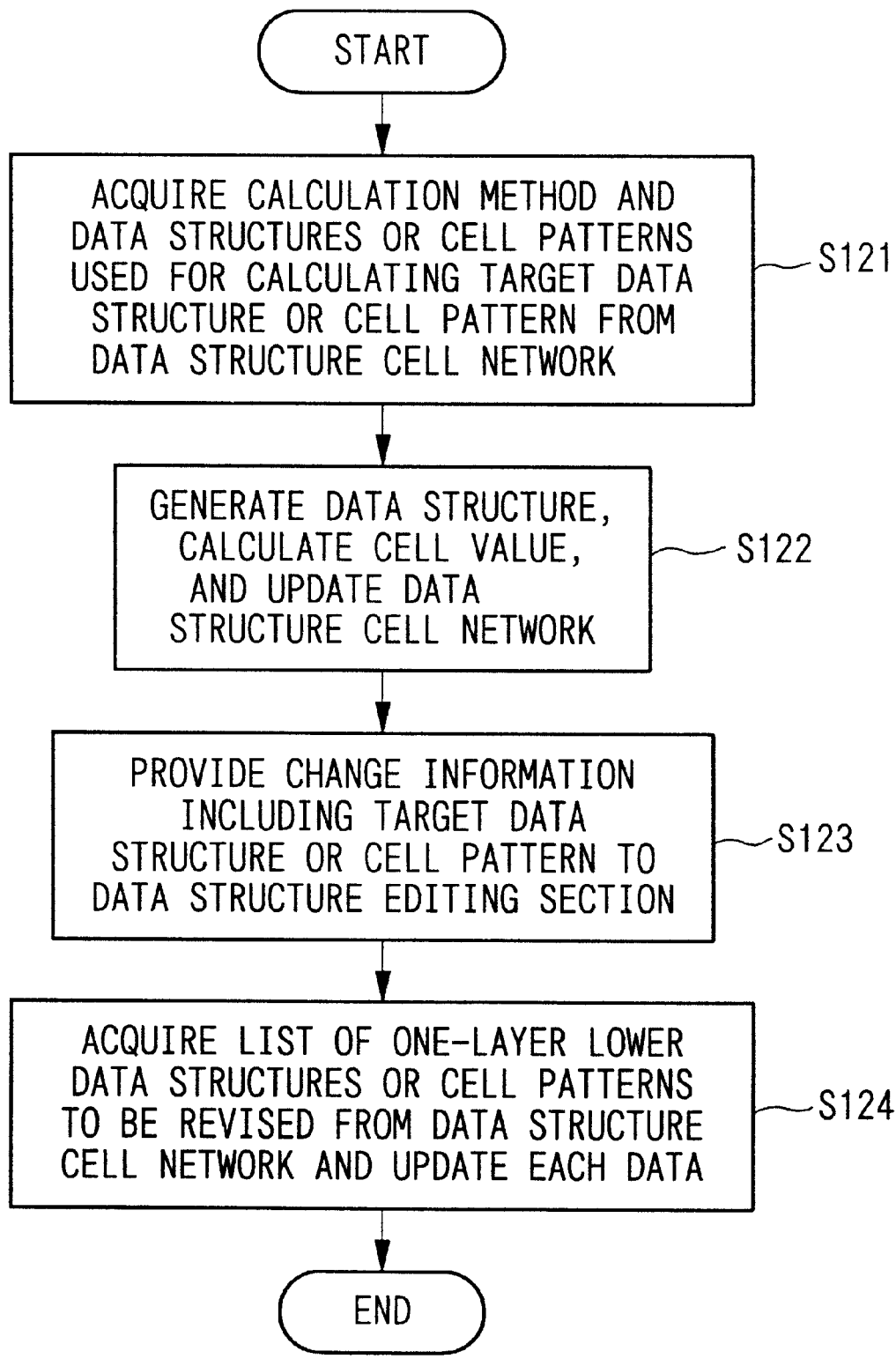
FIG. 12 is a flowchart showing an updating process performed by managing section 904 in detail.
Figure 13B:
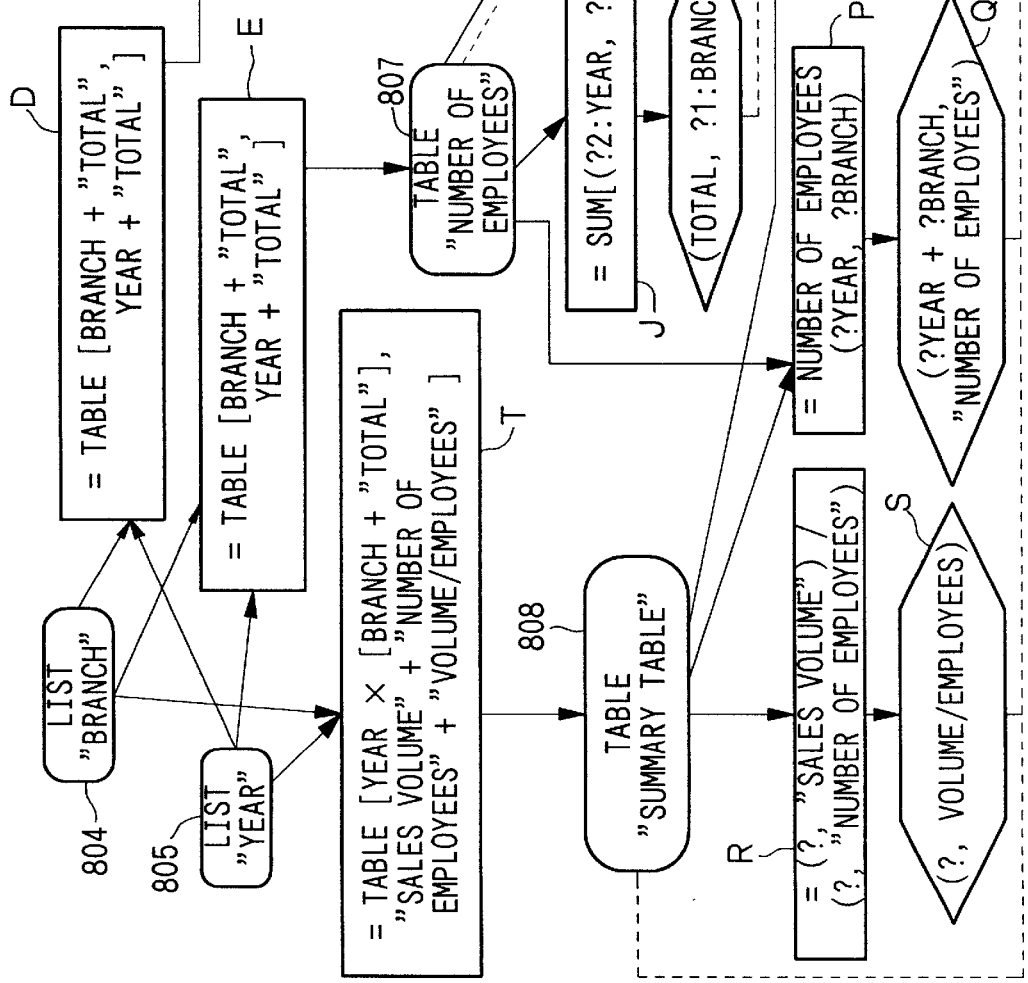
FIG. 13B shows a general data storage situation in the section 906.
Figure 13A:
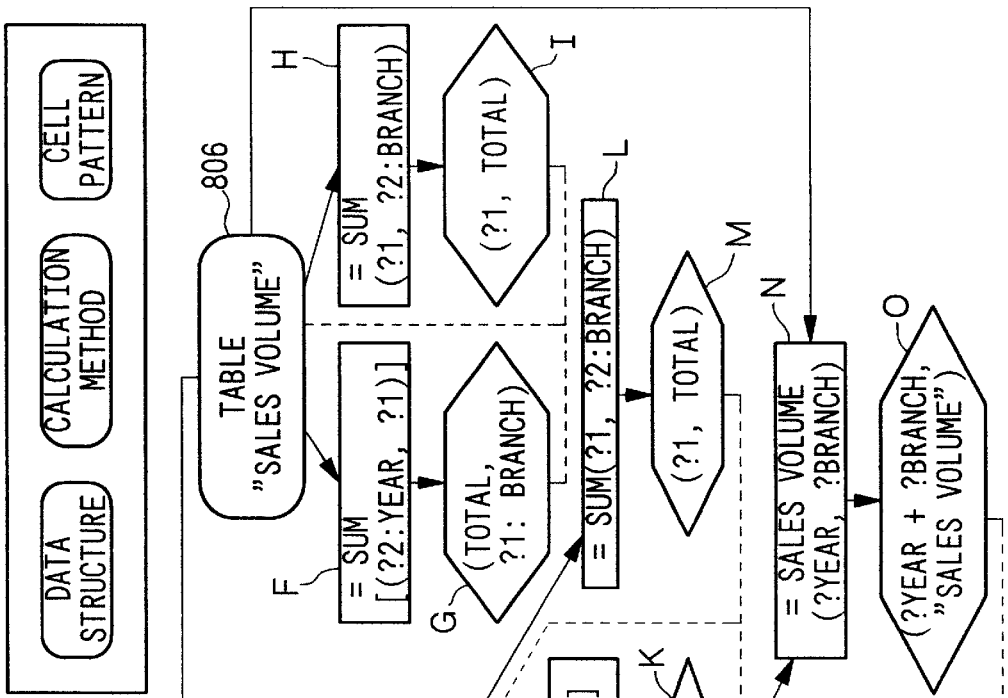
FIG. 13A is a diagram showing a structural example of data structure cell network storage section 906.

FIG. 9 is a flowchart showing an operational example of data structure cell editing section 902, FIG. 10 is a flowchart showing an operational example of calculation method editing section 903, FIG. 11 is a flowchart showing an operational example of managing section 904, FIG. 12 is a flowchart showing an updating process performed by managing section 904 in detail, FIG. 13A is a diagram showing a structural example of data structure cell network storage section 906, FIG. 13B shows a general data storage situation in the section 906, and FIG. 14 is a diagram showing an example of the display screen of display section 908. Hereinbelow, operations of the present embodiment will be explained with reference to each figure.

The display screen shown in FIG. 14 shows data for two branch offices of a company and shows results of calculations in which table 808 is calculated based on data of the sales volumes and the number of employees in the two branch offices for the present and previous year.

The display screen as shown in FIG. 14 includes, as in the display screen of FIG. 7, parts such as a menu for selecting the kind of method for calculating data structures, a name entry for designating a name of a new data structure, a calculation method entry for inputting details of the relevant calculation method, and each data structure 804–808. These data structures 804–808 are displayed using a format of the multi-window system.

A user first inputs list 804 of name "BRANCH" by using input section 907 (see arrow 9B).

When the list 804 of name "BRANCH" is input (see steps S91 and S92 in FIG. 9), the data structure cell editing section 902 provides change information, which includes the name "BRANCH" and substantial data of the input list 804, to managing section 904 (see step S93).

When the managing section 904 receives the above change information from data structure cell editing section 902 (see steps S111 and S112 in FIG. 11), the section 904 updates the content of data structure cell network storage section 906 (see step S113). In this example, the substance of list 804 of name "BRANCH" is stored into data structure cell network storage section 906, as shown in FIG. 13A. After that, the managing section 904 acquires lists of data structures and cell patterns which depend on list 904 and which are one-layer lower than that of list 904, based on the data structure cell network stored in data structure cell network storage section 906 (see step S114). The managing section 904 tries to perform an updating process based on the acquired lists (see step S115). However, in this example, no data structure and no cell pattern being dependent on list 804 exist; thus, no updating process is performed.

After that, the user inputs list 805 of name "YEAR" via input section 907 (see arrow 9B). In this way, operations similar to those described above are performed in data structure cell editing section 902 and managing section 904, and list 805 of name "YEAR" is stored into data structure cell network storage section 906, as shown in FIG. 13A.

The user then selects "MAKE NEW TABLE" in the menu, provides a name "SALES VOLUME" of table 806 to be newly generated in the name entry, and provides a calculation method "=TABLE [BRANCH +"TOTAL", YEAR +"TOTAL"]" to the calculation method entry. In this way, the user directs that table 806 of name "SALES VOLUME" be newly generated (see arrow 9E).

When the calculation method editing section 903 is commanded to generate table 806 (see steps S101 and S102 in FIG. 10), the section 903 provides change information (9I), which includes the name "SALES VOLUME" of table 806 and the above calculation method "=TABLE [BRANCH+"TOTAL", YEAR+"TOTAL"]", to managing section 904 (see step S103).

When the managing section 904 receives the above change information (9I) from the calculation method editing section 903 (see steps S111 and S112 in FIG. 11), the managing section 904 updates the data structure cell network (see step S116). In this example, the managing section 904 stores calculation method "=TABLE [BRANCH+ "TOTAL", YEAR+"TOTAL"]" D into data structure cell network storage section 906 in connection with lists 804 and 805.

After that, managing section 904 performs an updating process with respect to the data structure indicated by the change information (9I) (that is, table 806 of name "SALES VOLUME")(see step S117).

Operations performed in the updating process of step S117 will be explained in detail with reference to the flowchart of FIG. 12.

First, a calculation method and data structures used for generating table 806 of name "SALES VOLUME" are acquired with reference to the data structure cell network (see step S121). In the case of this example, managing section 904 acquires calculation method "=TABLE [BRANCH+"TOTAL", YEAR+"TOTAL"]" D and lists 804 and 805.

After that, managing section 904 generates table 806 of name "SALES VOLUME" based on the calculation method D and lists 804 and 805 which were acquired in the above step S121, and further updates the content of the data structure cell network storage section 906 (see step S122). In this example, managing section 904 generates table 806 and adds the table to data structure cell network storage section 906 in connection with calculation method D, as shown in FIG. 13A. In this step, only header parts are generated but each cell has no value.

The managing section 904 then provides change information (9G), which includes the substance of table 806 generated in step S122, to data structure cell editing section 902 (see step S123).

When the data structure cell editing section 902 receives the above change information (9G) (see steps S91 and S92 in FIG. 9), the section 902 displays the newly generated table 806 in display section 908 (see step S95).

After that, managing section 904 refers to the data structure cell network, and acquires one-layer lower data structures and cell patterns which depend on table 806. The managing section 904 tries to perform an updating process with respect to such data structures and cell patterns indicated by the lists (see step S124). However, in this example, no data structure or cell pattern depending on table 806 exists; thus, no updating process is performed.

After making table 806 of name "SALES VOLUME", the user select "MAKE NEW TABLE" in the menu, provides a name "NUMBER OF EMPLOYEES" of table 807 to be newly generated to the name entry, and provides a calculation method "=TABLE [BRANCH+"TOTAL", YEAR+"TOTAL"]" to the calculation method entry, by which the user directs that table 807 of name "NUMBER OF EMPLOYEES" be newly generated (see arrow 9E).

In this way, operations similar to those explained above are performed. As a result, calculation method "TABLE [BRANCH+"TOTAL", YEAR+"TOTAL"]" E is stored into the data structure cell network storage section 906 in connection with lists 804 and 805, as shown in FIG. 12, and simultaneously, table 807 of name "NUMBER OF EMPLOYEES" is stored in connection with calculation method E. Then, the frame of table 807 is displayed in display section 908.

After that, the user selects "CHANGE DATA STRUCTURE" in the menu, provides name "SALES VOLUME" of table 806 to the name entry, and inputs a value to each cell belonging to each year of each branch office in table 806.

When the value of each cell of table 806 is input (see steps 91 and S92 in FIG. 9), the data structure cell editing section 902 provides change information (9H), which includes the name "SALES VOLUME" and the substance of table 806, to managing section 904 (see step S94).

When the managing section 904 receives the above change information (9H) (see steps S111 and S112 in FIG. 11), the section 904 updates the data structure cell network (see step S113). In this example, managing section 904 replaces table 806 (comprising only a frame) stored in data structure cell network storage section 906, with the substance of table 806 (that is, the table in which the cells of each year in each branch office have been set) which is included in change information (9H).

After the user inputs values of cells of each year in each branch office in table 806, the user further inputs the values of cells of each year in each branch office in table 807 of name "NUMBER OF EMPLOYEES" on the display screen in display section 908. In this way, operations similar to those explained above are performed, and table 807 (having only a frame) stored in data structure cell network storage section 906 is replaced with the substance of table 807 (in which the cells of each year in each branch office have been set) included in change information (9H).

After that, the user selects "SALES VOLUME", the name of table 806, in data structure menu 801; provides a cell pattern "(TOTAL, ?1: BRANCH)", which indicates each cell to which a calculated result is provided, to cell pattern entry 802; and provides a calculation method "=SUM [(?2:YEAR, ?1)]" to cell calculation method entry 803, by which the user directs that each cell in table 806 indicated by the above cell pattern be revised according to the above calculation method (see arrow 9F). Here, the expression "?1: BRANCH" in the above cell pattern indicates a variable "?1" which matches any element in list 804. The calculation method "=SUM [(?2:YEAR, ?1)]" indicates to calculate a total value of the cells in all columns, which suit the pattern "?2:YEAR" and which exist in the same line as a target cell designated by variable "?1". Here, the pattern "?2:YEAR" matches any element of list 805. Accordingly, representation of the above commands is such that the "TOTAL" cell of each branch office should be set to be a total of the values belonging to each year of the relevant branch office.

In this way, calculation method editing section 903 provides change information (9I), which includes information indicating the revised cell pattern and the calculation method, to managing section 904 (see steps S101, S102, S104 in FIG. 10).

When managing section 904 receives the above change information (9I) (see steps S111 and S112 in FIG. 11), the section 904 updates the content of data structure cell network storage section 906 (see step S116). In this case, managing section 904 stores calculation method F in connection with table 806 and also stores cell pattern G in connection with calculation method F and table 806, as shown in FIG. 13A.

After that, managing section 904 acquires calculation method F of cell pattern G and the values of cells used for the relevant calculation from data structure cell network storage section 906 (see step S121 in FIG. 12). The managing section 904 then provides calculation method F and the cell values to calculating section 905 so as to calculate the value of each cell indicated by cell pattern G, and provides calculated values to each relevant cell (the "TOTAL" cell of each branch office) indicated by cell pattern G in table 806 which is stored in data structure cell network storage section 906 (see step S122).

The managing section 904 then provides change information (9G), which includes information indicating the cell defined by the cell pattern and the calculated results, to data structure cell editing section 902 (see step S123). According to these operations, data structure cell editing section 902 controls the display of the above calculated results in the "TOTAL" cell of each branch office in table 806 displayed in 908.

After that, managing section 904 acquires lists of one-layer lower data structures and cell patterns which should be revised according to the above setting operations with respect to the cells. The managing section 904 tries to perform an updating process according to the content of the lists (see step S124). However, in this example, such a data structure or cell pattern does not exist; thus, no updating process is performed.

The user then selects "SALES VOLUME", the name of table 806, as data structure menu 801; provides a cell pattern "(?1, TOTAL)", which indicates a cell to which a calculated result is input, to cell pattern entry 802; provides a calculation method "=SUM(?1, ?2:BRANCH)" to cell calculation method entry 803, by which the user directs that the value of the "TOTAL" cell in the last line in table 806, indicated by the cell pattern, be revised (see arrow 9F). Here, all cells which suit the above cell pattern are respectively regarded as target cells, and calculations according to the calculation method are performed for the target cells. In this way, operations similar to those explained above are performed, and into data structure cell network 906, the above calculation method "=SUM(?1, ?2:BRANCH)" H is stored in connection with table 806 and cell pattern "(?1, TOTAL)" I is stored in connection with calculation method H and table 806, and each "TOTAL" cell in the last line of table 806 is set to be a relevant total value.

After that, the user similarly directs that in table 807 of name "NUMBER OF EMPLOYEES", a total value of each branch office and total values in the last line are respectively determined. In these operations, as shown in FIG. 13A, calculation methods "=SUM[(?2:YEAR, ?1)]" J and "=SUM(?1, ?2:BRANCH)" L are stored in connection with table 807, and cell patterns "(TOTAL, ?1:BRANCH)" K and "(?1, TOTAL)" M are stored in connection with calculation methods J and L, and table 807.

After all cells of tables 806 and 807 are set, the user selects "MAKE NEW TABLE" in the menu, provides a name "SUMMARY TABLE" to the name entry, provides a calculation method "=TABLE [YEAR×[BRANCH+"TOTAL"], "SALES VOLUME"+"NUMBER OF EMPLOYEES"+"VOLUME/EMPLOYEES"]" to the calculation method entry, by which the user directs that table 808 of name "SUMMARY TABLE" be made. Here, the above calculation methods indicates to make a hierarchical table in which column headers are two-step layered, where the first layer includes each element of list 805 (relating to the year), and regarding each year in this first layer, the second layer includes each element of table 804 (relating to the branch office) and a "TOTAL" cell, and as row headers, "SALES VOLUME", "NUMBER OF EMPLOYEES", and "VOLUME/EMPLOYEES" are provided.

In this way, operations similar to those explained above are performed, and the above calculation method "=TABLE [YEAR×[BRANCH+"TOTAL"], "SALES VOLUME"+"NUMBER OF EMPLOYEES"+"VOLUME/EMPLOYEES"]" T is stored into data structure cell network storage section 906 in connection with lists 804 and 805, and table 808 is also stored in connection with calculation method T, as shown in FIG. 13A. Furthermore, table 808 is displayed in display section 908.

After that, the user sets data structure menu 801 to be "SUMMARY TABLE", the name of table 808; provides a cell pattern "(?YEAR+?BRANCH, "SALES VOLUME")" to cell pattern entry 802; and provides a calculation method "=SALES VOLUME ("?YEAR, ?BRANCH)" to cell calculation method entry 803, by which the user directs that the cells of the sales volume in table 808 be set. In this way, operations similar to those explained above are performed, and the "SALES VOLUME" cells in table 808 are set. Simultaneously, into data structure cell network storage section 906, calculation method "=SALES VOLUME (?YEAR, ?BRANCH)" N is stored in connection with tables 806 and 808; cell pattern "(?YEAR+?BRANCH, "SALES VOLUME")" O is stored in connection with the calculation method N and table 808, as shown in FIG. 13A.

After that, the user selects name "SUMMARY TABLE", the name of table 808, in data structure menu 801; provides a cell pattern "(?YEAR+?BRANCH, "NUMBER OF EMPLOYEES")" to cell pattern entry 802; provides a calculation method "=NUMBER OF EMPLOYEES (?YEAR, ?BRANCH)", by which the user directs that the cells of the number of employees in table 808 be set. In this way, operations similar to those explained above are performed, and the "NUMBER OF EMPLOYEES" cells in table 808 are set. Simultaneously, into data structure cell network storage section 906, calculation method "=NUMBER OF EMPLOYEES (?YEAR, ?BRANCH)" P is stored in connection with tables 807 and 808; cell pattern "(?YEAR+?BRANCH, "NUMBER OF EMPLOYEES")" Q is stored in connection with the calculation method P and table 808, as shown in FIG. 13A.

Lastly, the user selects "SUMMARY TABLE", the name of table 808, in data structure menu 801; provides a cell pattern "(?, VOLUME/EMPLOYEES)" to cell pattern entry 802; and provides a calculation method "=(?, "SALES VOLUME")/(?, "NUMBER OF EMPLOYEES)", by which the user directs that the cells in the last line of table 808 be set. Here, the special character "?" in the cell pattern indicates a variable which matches any column header, and the expression "VOLUME/EMPLOYEES" indicates a constant which only matches the row header "VOLUME/EMPLOYEES"; thus, the cells in the last line of table 808 are defined as target cells and are reverse displayed (refer to reference numeral 809 in FIG. 14). In the above calculation method, each target cell is set to be a value obtained by dividing the value of a corresponding cell relating to the sales volume in the relevant column having variable "?" (appearing in the cell pattern), by the value of a corresponding cell relating to the number of employees in the same column.

Accordingly, operations similar to those explained above are performed, and each cell of the last line in table 808 is set, and as shown in FIG. 13A, the above calculation method "=(?, "SALES VOLUME")/(?, "NUMBER OF EMPLOYEES)" R is stored in connection with table 808 and cell pattern "(?, VOLUME/EMPLOYEES)" S is stored in connection with calculation method R and table 808.

According to the above operations, table 808 of name "SUMMARY TABLE" is generated as shown in FIG. 14.

If another item such as the Nagoya branch office should be added to table 808 at a later time, the user adds name "NAGOYA" to list 804 on the display screen of display section 908.

When "NAGOYA" is added to list 804 (see steps S91 and S92 in FIG. 9), the data structure cell editing section 902 provides change information (9H), which includes the name "BRANCH" and the substance of list 804, to managing section 904 (see step S94).

When the managing section 904 receives change information (9H) (see steps S111 and S112 in FIG. 11), the section 904 updates the content of data structure cell network storage section 906 (see step S113). In the operation of this example, the list 804 which has already been stored (and which does not include "NAGOYA")is replaced with new list 804 which is included in the above change information (9H) (and which thus includes "NAGOYA").

After that, the managing section 904 refers to data structure cell network storage section 906 and acquires a list of one-layer lower data structures which depend on list 904 of name "BRANCH" (see step S114). In this example, in the acquired list, names "SALES VOLUME", "NUMBER OF EMPLOYEES", and "SUMMARY TABLE" are included.

The managing section 904 then performs updating operations with respect to tables 806, 807, and 808 of the names "SALES VOLUME", "NUMBER OF EMPLOYEES", and "SUMMARY TABLE" (see step S115). In this way, a new line of header "NAGOYA" is added to each of table "SALES VOLUME" 806 and table "NUMBER OF EMPLOYEES" 807, and a new column corresponding to column header "NAGOYA" in the second layer is added below each of the first layer column headers relating to each year (see steps S121–S123 in FIG. 12). After that, managing section 904 tries to perform updating operations with respect to cell patterns G, I, K, M, O, Q, and S which depend on tables 806, 807, and 808 (see step S124). However, the cell values necessary for performing such operations are not determined; thus, no updating operation is performed. When the user sets each cell in the line "NAGOYA" in each of tables 806 and 807 at a later time, similar operations to those described above are performed, and the "TOTAL" cells in tables 806 and 807 and all cells in the "NAGOYA" columns in table 808 are recalculated and set.

In addition, regarding the display situation as shown in FIG. 14, if the user revises the value of a cell in table 806 (the cell being the one indicating the sales volume of the previous year for the Tokyo branch office) from "10" to "20" by using input section 907, data structure cell editing section 902 provides change information, which includes information indicating the relevant cell and its value, to managing section 904 (see steps S91, S92, and S95 in FIG. 9).

In this way, managing section 904 changes the value of the above cell of table 806, stored in data structure cell network storage section 906, to "20" (see steps S111, S112, and S116 in FIG. 11), and further recalculates and updates the values of cells which depend on the above cell and which are indicated by cell patterns G, I, O, Q, and S (see steps S121–S124 in FIG. 12). That is, the "TOTAL" cells in the vertical and horizontal lines in table 806, and the "TOTAL" cells and the cells in the last line in table 808 are updated. Here, if it is directed that the operations of data calculator 901 be finished, data structure cell editing section 902 provides a termination event to calculation method editing section 903, managing section 904, and calculating section 905 (see step S96).

In this embodiment, as in the first embodiment, each data structure is managed according to a multi-window system; thus, it is convenient when various data structures are calculated and are respectively displayed and printed. Additionally, as shown in an ordinary multi-window system, functions such as changing a window size, transforming a window into an icon, and moving a window are provided; thus, it is possible to arrange only the necessary tables so that they are clearly shown.

Also in the present embodiment, as in the first embodiment, not only the following operation is possible in which if the value of any cell of tables 806 and 807 of names "SALES VOLUME" and "NUMBER OF EMPLOYEES" is changed, then the value of each corresponding cell of summary table 808 is automatically recalculated and changed, but also the following operation is possible in which even if a structural change relating to tables 806–808 is caused according to a change of addition or deletion of an element in lists 804 and 805 of names "BRANCH" and "YEAR", each dependence relationship can be maintained according to automatic recalculation. Therefore, there occurs an effect in that revision by a user is unnecessary in this case.

On the other hand, in the conventional spread-sheet type data calculators, calculations between varied data structures are difficult because it is difficult to represent such varied structures using only positional relationships between the cells. However, in the present embodiment, such calculations can easily be performed.

FIG. 15 is a diagram showing a display screen example (as shown in FIG. 14) relating to the embodiment shown in FIG. 8. Hereinbelow, using the display screen example of FIG. 15, various methods in use and various effects relating to the embodiment will be explained.

In the display screen in FIG. 15, various data structures are calculated based on summary table 1001 in which name, age, sex, height, and weight data of children are included. List 1002 of name "3 YEARS OLD" is made by extracting the headers (of the names of children) relating to the age of three from among headers of summary table 1001. This list can be obtained via a calculation formula "=LIST [?:SUMMARY TABLE (AGE, ?)==3]".

In the above formula, pattern variable "?" matches the row header of any cell having value "3" in the column of header "AGE". The list 1003 of name "MALE" can be calculated using a similar way. Therefore, the present system has an effect in which data suitable for any necessary condition can be extracted.

The "AGE" table 1004 in FIG. 15 is made according to a formula "=TABLE ["NAME"+"HEIGHT"+"WEIGHT", SUMMARY TABLE (AGE, ?)]". The table 1004 has column headers "NAME", "HEIGHT", and "WEIGHT", and has row headers which consist of a list of different data included in the "AGE" column in summary table 1001. Here, a summarizing operation for removing overlapping data regarding all data in the AGE column of summary table 1001 is performed and results of this operation are provided as the row headers of "AGE" table 1004. Accordingly, it is possible to use an element for determining the structure itself of a data structure, like headers as results of a summarizing operation.

Also in the "AGE" table 1004 in FIG. 15, plural data are registered in each cell. These data are calculated by a cell pattern "(?ITEM, ?AGE)" which matches any cell and a cell calculating formula "=SUMMARY TABLE (?ITEM, ?:SUMMARY TABLE (AGE, ?)==?YEARS OLD)". This formula means to put the values of all cells in summary table 1001 which satisfy the following conditions together, the conditions such as:

(i) having the same column header (i.e., any one of "NAME", "HEIGHT", and "WEIGHT")as a target cell (in table 1004);

(ii) the corresponding age data agreeing with the value indicated by the pattern variable "?YEARS OLD" (that is, each row header of "AGE" table 1004). As explained above, it is possible to make a data structure in which plural data suitable 10 for desired conditions are included in a cell.

The table of "AVERAGE BY AGE" in FIG. 15 is generated by taking the average of values in each cell in the "HEIGHT" and "WEIGHT" columns in the "AGE" table 1004. These averages are calculated by formula "=AVE [AGE TABLE ("HEIGHT"+"WEIGHT", ?)]". In this calculation, an average regarding each set of a plurality of data stored in each cell of the "AGE" table 1004 is calculated, and using the results, a new table "AVERAGE BY AGE" 1006 is generated, whose structure is similar to that of the "AGE" table 1004 but which does not include the column of header "NAME" included in table 1004. In the table of "AVERAGE BY SEX" 1007 in FIG. 15, average height and weight for each sex are calculated according to similar calculations. Therefore, in the present embodiment, it is possible to perform (i) summarizing calculations, (ii) a calculation for changing a data structure while the original data structure is used in the calculation, and (iii) a calculation in which the above calculations (i) and (ii) are combined.

As an example of conversion of the data structure, the following methods are also possible:

(1) definition of a line or a column in a table as a single cell, and registration of all values of the cells in the relevant line or column into the single cell in a list format;

(2) exchange of cell values and headers in a table;

(3) assumption that a table indicates a function from headers to cells, and generation of a new table relating to results obtained by applying this function to each cell value of another table; and (4) regarding a data structure having a network consisting of nodes and edges, replacement of each node with an edge and replacement of each edge with a node.

As explained above, the present system has a recalculation function via designation of a calculation method between a data structure and cells and their dependence relationship; thus, complicated relationships between various data can be easily represented. Accordingly, it is possible to easily cope with a revision of data.

Figure 16:
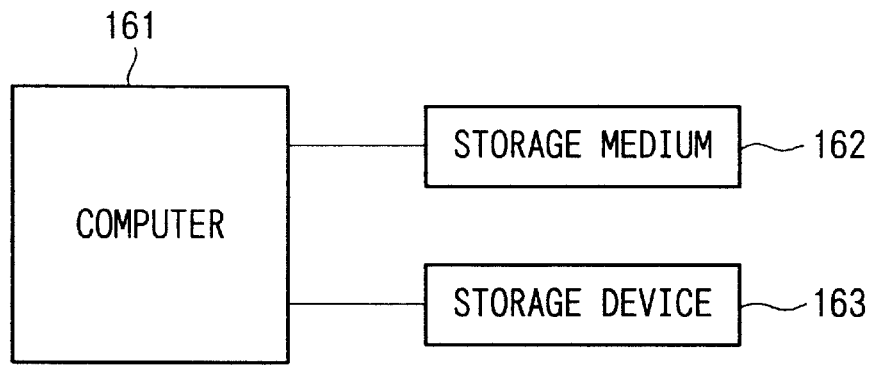
FIG. 16 is a block diagram showing a hardware structure of the data calculators shown in FIGS. 1 and 8.
Figure 17:
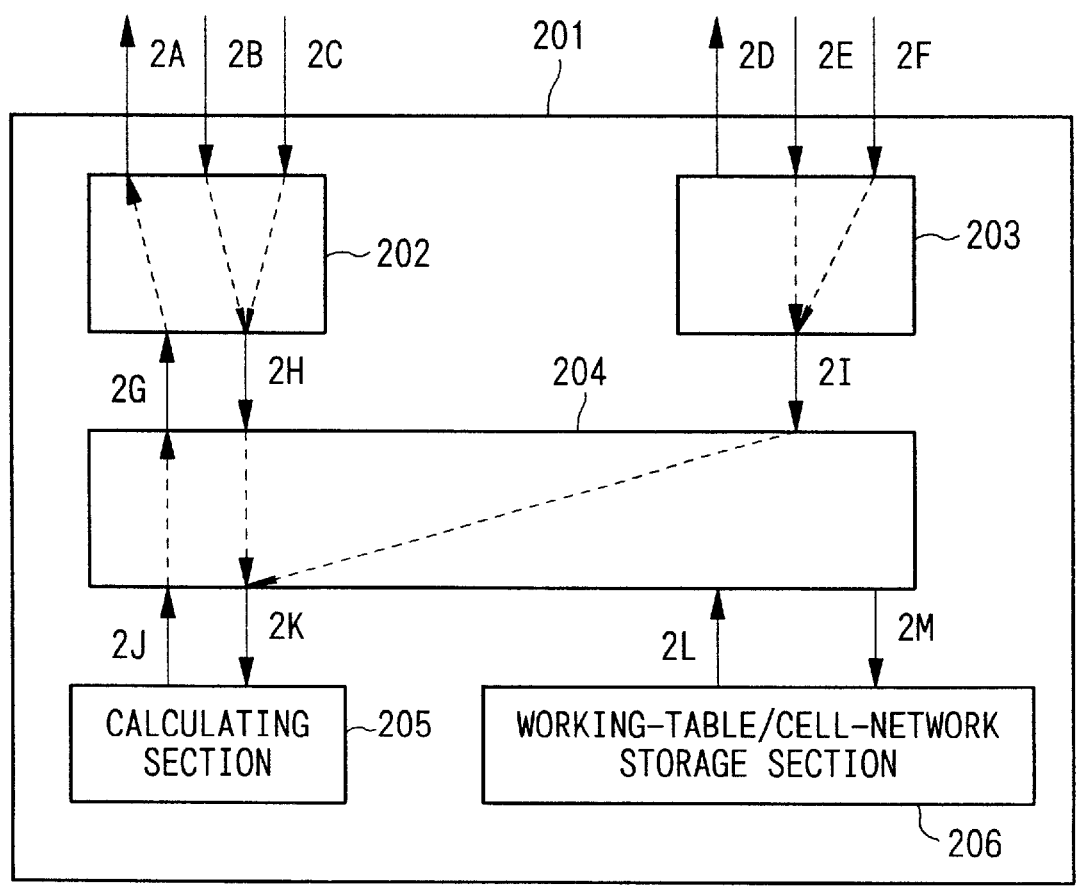
FIG. 17 is a block diagram showing a structural example of conventional spread-sheet type data calculator 201.
Figure 19:
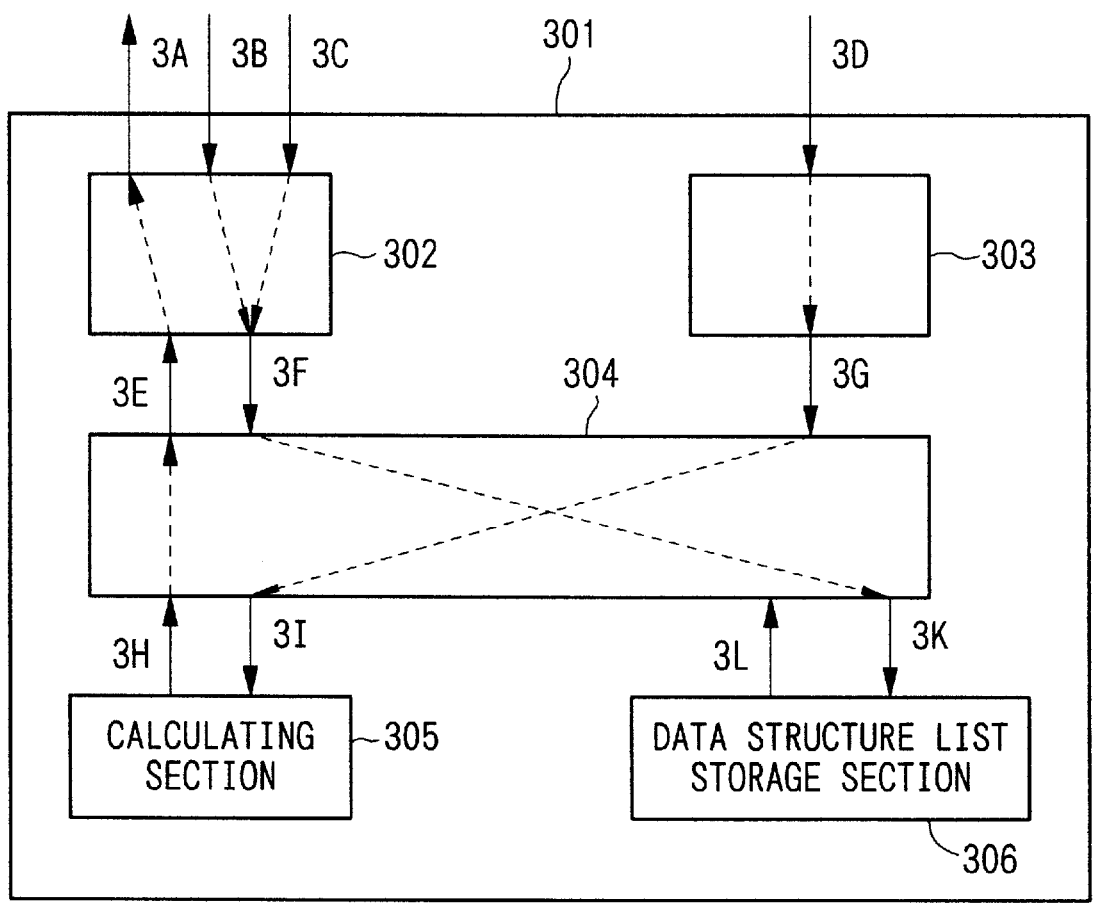
FIG. 19 is a block diagram showing an example of conventional non-restricted processing type data calculator 301.

FIG. 16 is a block diagram showing a hardware structure of the data calculators shown in FIGS. 1 and 8, the structure comprising computer 161, storage medium 162 storing a program for calculating data, and storage device 163. The storage medium 162 is a magnetic disk, a semiconductor memory, or the like.

In order to realize the data calculator as shown in FIG. 1, the program for calculating data is loaded by computer 161 and data structure editing section 102, calculation method editing section 103, managing section 104, and calculating section 105 in FIG. 1 are realized in computer 161 by controlling operations of each portion of the computer. The data structure network storage section 106 is realized in storage device 163.

On the other hand, in order to realize the data calculator as shown in FIG. 8, a program for calculating data stored in storage medium 162 is loaded by computer 161 and data structure cell editing section 902, calculation method editing section 903, managing section 904, and calculating section 905 as shown in FIG. 8 are realized in computer 161 by controlling operations of each portion of the computer. The data structure cell network storage section 906 is realized in storage device 163.

What is claimed is:

1. A data calculator comprising:

a data structure network storage section containing one or more already generated data structures, a program for a calculation method used for generating each data structure based on one or more other data structures, and said one or more other data structures in a format by which dependence relationships between the data structures and the calculation method are detectable; and a managing section, wherein when a calculation method is input which indicates the generation of a new data structure based on one or more already generated data structures, the managing section generates a new data structure based on the above calculation method and one or more already generated data structures stored in the data structure network storage section, and stores the generated new data structure and the above-mentioned calculation method into the data structure network storage section in a format in which dependence relationships between the newly stored data structure and calculation method, and the already-stored data structures and calculation method are detectable, at least one of said dependence relationships being other than a corresponding positional relationship between the newly stored data structure and the already stored data structure wherein said newly and already stored data structures comprise a table, list or graph;

when revision of the calculation method is directed, the managing section revises the calculation method which is stored in the data structure network storage section and for which revision was directed, and the managing section also revises all data structures, which depend on the calculation method for which revision was directed, based on the data structures and calculation method stored in the data structure network storage section; and when revision of a cell value or a frame of the already generated data structure is directed, the managing section revises the data structure which is stored in the data structure network storage section and for which revision was directed, and the managing section also revises all data structures, which depend on the data structure for which revision was directed, based on the data structures and calculation method stored in the data structure network storage section.

2. A data calculator as claimed in claim 1, further comprising a calculating section, and wherein when a new data structure is generated or an already generated data structure is revised, if values of one or more cells on the data structure are necessary, then the managing section makes the calculation section calculate the values of the cells on the data structure.

3. A data calculator comprising:

a data structure cell network storage section containing one or more already generated data structures, a program for a calculation method used for generating each data structure based on one or more other data structures, said one or more other data structures, a cell pattern indicating each cell which was set using a value of another cell in the same data structure, and a program for a calculation method used for calculating a value of the cell indicated by the cell pattern in a format by which dependence relationships between the data structures and the calculation method and the cell pattern are detectable; and a managing section, wherein when a calculation method is input which indicates the generation of a new data structure based on one or more already generated data structures, the managing section generates a new data structure based on the above calculation method and one or more already generated data structures stored in the data structure cell network storage section, and stores the generated new data structure and the above calculation method into the data structure cell network storage section in a format in which dependence relationships between the newly stored data structure and calculation method, and the already-stored data structures and calculation method are detectable, at least one of said dependence relationships being other than a corresponding positional relationship between the newly stored data structure and the already stored data structure wherein said newly and already stored data structures comprise a table, list or graph;

when revision of the calculation method is directed, the managing section revises the calculation method which is stored in the data structure cell network storage section and for which revision was directed, and the managing section also revises all data structures, which depend on the calculation method for which revision was directed, based on the data structures and calculation method stored in the data structure cell network storage section;

when revision of a value of a cell or a frame of the already generated data structure is directed, the managing section revises the data structure which is stored in the data structure cell network storage section and for which revision was directed, and the managing section also revises all data structures, which depend on the data structure for which revision was directed, based on the data structures and calculation method stored in the data structure cell network storage section;

when a cell pattern indicating a cell of a data structure and a calculation method for calculating a value of the cell indicated by the cell pattern are input, the managing section performs the calculation of the value of the cell indicated by the cell pattern according to the above calculation method, and sets the relevant cell in the data structure to the calculated value, and the managing section stores the cell pattern and the calculation method in a format in which dependence relationships between the newly stored cell pattern and calculation method, and the already-stored data structures, cell pattern, and calculation method are detectable; and when revision of a value of a cell in the already generated data structure is directed, the managing section revises the value of the cell which is stored in the data structure cell network storage section and for which revision was directed, and the managing section also revises the value of each cell indicated by each cell pattern which depends on a calculation method relating to the above direction of revision.

4. A storage medium storing a computer program for making a computer function as a managing section, the computer comprising a data structure network storage section containing one or more already generated data structures, a calculation method used for generating each data structure based on one or more other data structures, and said one or more other data structures are stored in a format by which dependence relationships between these stored data are detectable, and the managing section having the following functions:

when a calculation method is input which indicates the generation of a new data structure based on one or more already generated data structures, the managing section generates a new data structure based on the above calculation method and one or more already generated data structures stored in the data structure network storage section, and stores the generated new data structure and the above calculation method into the data structure network storage section in a format in which dependence relationships between the newly stored data structure and calculation method, and the already-stored data structures and calculation method are detectable, at least one of said dependence relationships being other than a corresponding positional relationship between the newly stored data structure and the already stored data structure wherein said newly and already stored data structures comprise a table, list or graph;

when revision of the calculation method is directed, the managing section revises the calculation method which is stored in the data structure network storage section and for which revision was directed, and the managing section also revises all data structures, which depend on the calculation method for which revision was directed, based on the data structures and calculation method stored in the data structure network storage section; and when revision of a value of a cell or a frame of the already generated data structure is directed, the managing section revises the data structure which is stored in the data structure network storage section and for which revision was directed, and the managing section also revises all data structures, which depend on the data structure for which revision was directed, based on the data structures and calculation method stored in the data structure network storage section.

5. A storage medium storing a computer program for making a computer function as a managing section, the computer comprising a data structure cell network storage section containing one or more already generated data structures, a calculation method used for generating each data structure based on one or more other data structures, said one or more other data structures, a cell pattern indicating each cell which was set using a value of another cell in the same data structure, a calculation method used for calculating a value of the cell indicated by the cell pattern are stored in a format by which dependence relationships between these stored data are detectable, and the managing section having the following functions:

when a calculation method is input which indicates the generation of a new data structure based on one or more already generated data structures, the managing section generates a new data structure based on the above calculation method and one or more already generated data structures stored in the data structure cell network storage section, and stores the generated new data structure and the above calculation method into the data structure cell network storage section in a format in which dependence relationships between the newly stored data structure and calculation method, and the already-stored data structures and calculation method are detectable, at least one of said dependence relationships being other than a corresponding positional relationship between the newly stored data structure and the already stored data structure wherein said newly and already stored data structures comprise a table, list or graph;

when revision of the calculation method is directed, the managing section revises the calculation method which is stored in the data structure cell network storage section and for which revision was directed, and the managing section also revises all data structures, which depend on the calculation method for which revision was directed, based on the data structures and calculation method stored in the data structure cell network storage section;

when revision of a value of a cell or a frame of the already generated data structure is directed, the managing section revises the data structure which is stored in the data structure cell network storage section and for which revision was directed, and the managing section also revises all data structures, which depend on the data structure for which revision was directed, based on the data structures and calculation method stored in the data structure cell network storage section;

when a cell pattern indicating a cell of a data structure and a calculation method for calculating a value of the cell indicated by the cell pattern are input, the managing section performs calculation of the value of the cell indicated by the cell pattern according to the above calculation method, and sets the relevant cell in the data structure to the calculated value, and the managing section stores the cell pattern and the calculation method in a format in which dependence relationships between the newly stored cell pattern and calculation method, and the already-stored data structures, cell pattern, and calculation method are detectable; and when revision of a value of a cell in the already generated data structure is directed, the managing section revises the value of the cell which is stored in the data structure cell network storage section and for which revision was directed, and the managing section also revises the value of each cell indicated by each cell pattern which depends on a calculation method relating to the above direction of revision.

* * * * *